US011423422B2

(12) United States Patent
Paulsen et al.

(10) Patent No.: US 11,423,422 B2
(45) Date of Patent: Aug. 23, 2022

(54) PERFORMING QUERY-TIME ATTRIBUTION MODELING BASED ON USER-SPECIFIED SEGMENTS

(71) Applicant: Adobe Inc., San Jose, CA (US)

(72) Inventors: Trevor Paulsen, Lehi, UT (US); Ivan Andrus, Saratoga Springs, UT (US); David Wilcox, Lehi, UT (US)

(73) Assignee: Adobe Inc., San Jose, CA (US)

( * ) Notice: Subject to any disclaimer, the term of this patent is extended or adjusted under 35 U.S.C. 154(b) by 296 days.

(21) Appl. No.: 16/189,812

(22) Filed: Nov. 13, 2018

(65) Prior Publication Data

US 2020/0151741 A1 May 14, 2020

(51) Int. Cl.
*G06F 16/9038* (2019.01)
*G06Q 30/02* (2012.01)
*G06F 16/904* (2019.01)

(52) U.S. Cl.
CPC ....... *G06Q 30/0201* (2013.01); *G06F 16/904* (2019.01); *G06F 16/9038* (2019.01)

(58) Field of Classification Search
CPC ............ G06Q 30/0201; G06F 16/9038; G06F 16/904
See application file for complete search history.

(56) References Cited

U.S. PATENT DOCUMENTS

| | | | |
|---|---|---|---|
| 7,212,625 B1 | 5/2007 | McKenna et al. | |
| 9,697,316 B1 | 7/2017 | Taylor et al. | |
| 10,169,778 B1 | 1/2019 | Collin et al. | |
| 10,332,156 B2 | 6/2019 | Buchalter et al. | |
| 10,599,642 B1 | 3/2020 | Hawes et al. | |
| 10,659,403 B2 | 5/2020 | Smullen et al. | |
| 10,970,338 B2 | 4/2021 | Paulsen et al. | |
| 2002/0116249 A1* | 8/2002 | Ellinger | G06Q 30/02 705/7.33 |
| 2007/0198505 A1 | 8/2007 | Fuller | |
| 2008/0288889 A1 | 11/2008 | Hunt et al. | |
| 2010/0131441 A1 | 5/2010 | Gruenhagen et al. | |

(Continued)

OTHER PUBLICATIONS

U.S. Appl. No. 16/189,739, Aug. 6, 2020, Office Action.

(Continued)

*Primary Examiner* — Grace Park
(74) *Attorney, Agent, or Firm* — Keller Preece PLLC

(57) ABSTRACT

The present disclosure relates to performing attribution modeling in real time using user-specified segments of touchpoint data retrieved from a database using a user-specified attribution model. For example, in one or more embodiments, a system stores raw touchpoint data in a database comprising an aggregator and a plurality of nodes. In particular, each node stores touchpoint data associated with a different user. Upon receiving a first query, the system can, in real time, generate and provide a first digital attribution report based on the stored touchpoint data. Upon receiving a second query, the system can generate a second digital attribution report for a user-specified segment of the touchpoint data represented in the first digital attribution report. Specifically, the system retrieves touchpoint data associated with the user-specified segment from the nodes of the database and uses the aggregator to combine the data to generate the second digital attribution report.

20 Claims, 15 Drawing Sheets

(56) References Cited

U.S. PATENT DOCUMENTS

| | | |
|---|---|---|
| 2010/0217650 A1 | 8/2010 | Hartnell |
| 2011/0302025 A1 | 12/2011 | Hsiao et al. |
| 2011/0320715 A1* | 12/2011 | Ickman ............... G06Q 30/02 711/118 |
| 2012/0046996 A1 | 2/2012 | Shah et al. |
| 2012/0226527 A1 | 9/2012 | Carwile, Jr. et al. |
| 2012/0303447 A1 | 11/2012 | Hughes et al. |
| 2013/0035975 A1* | 2/2013 | Cavander ............ G06Q 30/02 705/7.22 |
| 2013/0111350 A1* | 5/2013 | Ishii ................. G06Q 30/0201 715/739 |
| 2013/0301820 A1 | 11/2013 | Williams et al. |
| 2014/0195339 A1 | 7/2014 | Paulsen et al. |
| 2014/0244345 A1 | 8/2014 | Sollis et al. |
| 2014/0279057 A1* | 9/2014 | Shepherd .......... G06Q 30/0276 705/14.72 |
| 2015/0032725 A1* | 1/2015 | Barykin ............. G06F 16/2465 707/722 |
| 2015/0046828 A1* | 2/2015 | Desai .................. G06F 1/163 715/739 |
| 2015/0161652 A1 | 6/2015 | Schnabl et al. |
| 2016/0042388 A1 | 2/2016 | Chater |
| 2016/0063427 A1 | 3/2016 | Xu et al. |
| 2016/0098735 A1 | 4/2016 | Sinha et al. |
| 2016/0189207 A1 | 6/2016 | Xu et al. |
| 2016/0283969 A1 | 9/2016 | Chalimadugu et al. |
| 2017/0017971 A1 | 1/2017 | Moreau et al. |
| 2017/0039577 A1* | 2/2017 | Gauthier ........... G06Q 30/0201 |
| 2017/0046734 A1 | 2/2017 | Chittilappilly et al. |
| 2017/0169092 A1 | 6/2017 | Baird et al. |
| 2017/0180284 A1 | 6/2017 | Smullen et al. |
| 2017/0213237 A1 | 7/2017 | Yadagiri et al. |
| 2017/0323330 A1* | 11/2017 | Chittilappilly ..... G06Q 30/0244 |
| 2017/0337588 A1 | 11/2017 | Chittilappilly et al. |
| 2018/0096417 A1 | 4/2018 | Cook et al. |
| 2018/0308123 A1 | 10/2018 | Zhong et al. |
| 2018/0336639 A1 | 11/2018 | Dziabiak et al. |
| 2018/0336640 A1 | 11/2018 | Dziabiak et al. |
| 2019/0130040 A1 | 5/2019 | Ma et al. |
| 2019/0278378 A1 | 9/2019 | Yan et al. |
| 2020/0082442 A1 | 3/2020 | Sotomayor |
| 2020/0117740 A1 | 4/2020 | Schmidt et al. |

OTHER PUBLICATIONS

U.S. Appl. No. 16/189,739, Dec. 14, 2020, Notice of Allowance.
U.S. Appl. No. 16/166,806, Dec. 16, 2020, Office Action.
U.S. Appl. No. 16/167,143, May 26, 2021, Preinterview 1st Office Action.
U.S. Appl. No. 16/167,143, Jul. 14, 2021, 1st Action Office Action.
U.S. Appl. No. 16/166,806, Apr. 5, 2021, Office Action.
U.S. Appl. No. 16/166,806, Jul. 14, 2021, Notice of Allowance.
U.S. Appl. No. 16/189,784, May 21, 2021, Office Action.
U.S. Appl. No. 16/167,143, Oct. 29, 2021, Office Action.
U.S. Appl. No. 16/167,143, Jan. 27, 2022, Notice of Allowance.
U.S. Appl. No. 16/189,784, Nov. 23, 2021, Office Action.
U.S. Appl. No. 16/189,784, Mar. 15, 2022, Notice of Allowance.

\* cited by examiner

PERFORMING QUERY-TIME ATTRIBUTION MODELING BASED ON USER-SPECIFIED SEGMENTS

BACKGROUND

Advancements in software and hardware platforms have provided a variety of improvements in systems that enable digital content providers to manage campaigns for generating, providing, and distributing digital content across client devices. For example, attribution systems can analyze the effect of a campaign on the occurrence of a particular event (e.g., how the campaign influenced consumers to purchase a product). In particular, an attribution system can apply an attribution model to data representing consumer interactions with the digital content of a campaign (i.e., touchpoint data) and determine a percentage of event occurrences that can be attributed to different elements of the campaign, such as emails or banner advertisements distributed to the consumers or a website hosted or managed by the digital content provider.

Despite these advantages, conventional attribution systems have several technological shortcomings that result in inflexible and inefficient operation. For example, conventional attribution systems are often inflexible in that they rigidly collect data for predetermined digital attribution reports. In particular, many conventional systems preconfigure a database to store touchpoint data required by an attribution model previously selected by an administrator. Indeed, conventional systems often pre-process the stored data before an administrator requests an attribution report. Consequently, the conventional systems are often incapable of generating other attribution reports. To illustrate, a conventional system may configure a database to store consumers' first interaction with digital content (i.e., first touchpoint) in order to model consumer interactions using a first touch attribution model as previously selected by an administrator. However, the system would be unable to apply other attribution models (e.g., a last touch model) if the administrator later decides to model the consumer interactions differently. Further, the system would be unable to generate a deeper attribution analyses.

In addition to flexibility concerns, conventional attribution systems are also inefficient. For example, conventional systems typically struggle to efficiently adapt to changing administrator requests. In particular, because conventional systems are often unable to apply attribution models to touchpoint data unless the database has been preconfigured for those models, such systems often must reconfigure the database to accommodate any newly applicable models. Consequently, the conventional systems often require additional computing resources (e.g., processing time and power) in order to reconfigure the database accordingly.

These, along with additional problems and issues, exist with regard to conventional attribution systems.

SUMMARY

One or more embodiments described herein provide benefits and/or solve one or more of the foregoing or other problems in the art with systems, methods, and non-transitory computer readable storage media that perform attribution segmentation in real time at the time of request using a backend analytics system designed to allow for flexible, query-time attribution modeling. For example, in one or more embodiments, a system stores raw, unprocessed analytics data in a database that comprises an aggregator and a plurality of nodes. In particular, each node stores the analytics data associated with a different user (e.g., consumer). The structure of the system enables the system to flexibly and efficiently apply user-specified attribution models to user-specified segments of data on-demand at query time. Thus, the system allows users to compare attribution models across products, user types, device types, etc. Furthermore, in addition to high-level attribution segmentation, the system also provides for deeper analysis of segment attribution. In particular, the system can provide side-by-side analysis of multiple segments using the same or different attribution models.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
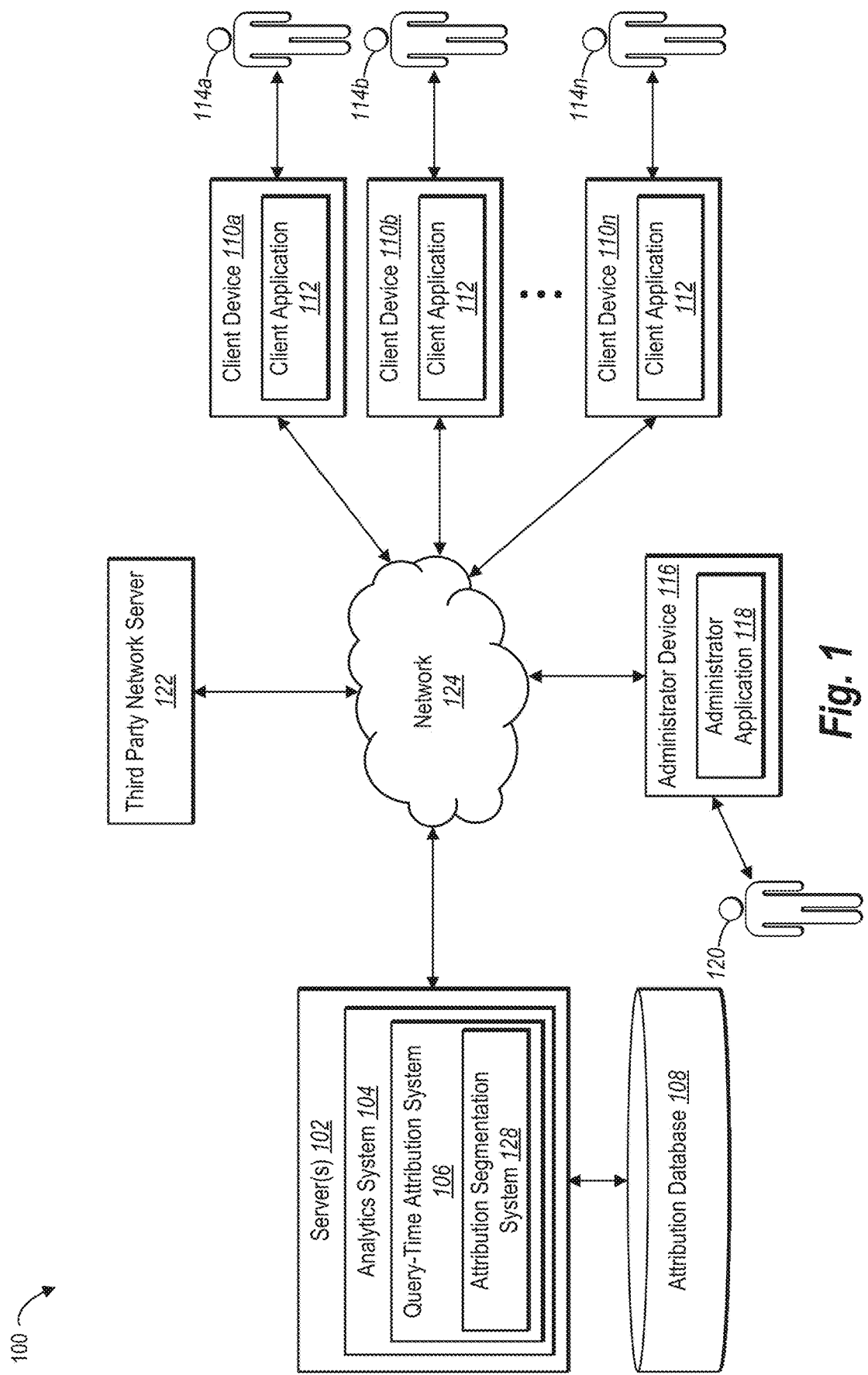
FIG. 1 illustrates an example environment in which an attribution segmentation system can operate in accordance with one or more embodiments.

One or more embodiments described herein include an attribution segmentation system that performs query-time attribution modeling for user-specified segments using a database structured to allow for flexibility and speed. For instance, the attribution segmentation system can store raw, unprocessed data in a plurality of nodes of an attribution database where each node corresponds to a different user (i.e., stores raw data associated with that user). The attribution segmentation system can subsequently apply attribution logic to the stored data at query time to perform complex, on-demand attribution modeling for a user-specified segments.

As described below, the structure of the attribution segmentation system enables the system to flexibly and efficiently apply user-specified attribution models to user-specified segments of data on the fly (e.g., on-demand at query time). In particular, the attribution segmentation system allows users to compare attribution models across products, user types, device types, etc. Thus, rather than being limited to pre-computed reports, the attribution segmentation system provides flexibility to segment attribution analyses in real-time in response to query time requests by a user.

Furthermore, in addition to high-level attribution segmentation, the attribution segmentation system also provides for deeper analysis of segment attribution. In particular, the attribution segmentation system can provide side-by-side analysis of multiple segments using the same or different attribution models. In other words, the attribution segmentation system generates comparisons of attribution models across products, user types, device types, etc. to allow for deeper analysis of analytics data.

More particularly, upon receiving a first query, the attribution segmentation system can generate and provide a first digital attribution report. Upon receiving a second query that specifies a segment represented in the first report, the attribution segmentation system can, in real time, retrieve subsets of data associated with the user-specified segment from the plurality of nodes in accordance with a user-specified attribution model. The attribution segmentation system can then combine the subsets of data using an aggregator of the attribution database and generate the digital attribution report based on the combined data.

To provide an example, in one or more embodiments, the attribution segmentation system stores touchpoint data in an attribution database that comprises an aggregator and a plurality of nodes. In particular, each node stores touchpoint data associated with a different user. In response to a first query, the system can provide a first digital attribution report for a user-specified dimension based on a user-specified attribution model. The system can then receive a second query that provides a user-specified segment of the touchpoint data reflected in the first digital attribution report. In response to receiving the second query, and in real time, the system can retrieve, from one or more of the nodes, a subset of the touchpoint data associated with the user-specified segment and corresponding to the user-specified dimension in accordance with the user-specified attribution model. The system can then combine the retrieved data using the aggregator, generate a second digital attribution report based on the combined data, and provide the second digital attribution report for display on a client device.

As just mentioned, in one or more embodiments, the attribution segmentation system stores touchpoint data in an attribution database that comprises a plurality of nodes. In particular, each node can correspond to a separate user and the attribution segmentation system can store all touchpoint data associated with that user in the corresponding node. In one or more embodiments, each instance of touchpoint data includes a timestamp and the attribution segmentation system stores the touchpoint data in each node sequentially based on the time stamp. The attribution segmentation system can further retrieve subsets of touchpoint data from the nodes in response to a query to generate a digital attribution report. To illustrate, in one or more embodiments, each node includes a processing unit that, in response to a query, filters to exclude touchpoint data that is not associated with a user-specified segment and does not correspond to a user-specified dimension and analyzes the remaining data in accordance with a user-specified attribution model.

The attribution database further includes one or more aggregators. After retrieving the subsets of touchpoint data from the plurality of nodes, the attribution segmentation system can use the aggregator to combine the subsets of touchpoint data. In particular, the aggregator can combine instances of touch point data that correspond to the same dimension value. The attribution segmentation system can utilize the combined subsets of touchpoint data to generate a digital attribution report.

In one or more embodiments, the attribution database further comprises a plurality of intermediate aggregators. In particular, each intermediate aggregator can correspond to a subset of nodes and can combine the subsets of touchpoint data retrieved from its corresponding subset of nodes to generate a set of aggregated touchpoint data. Subsequently, the attribution segmentation system can use the aggregator (i.e., a master aggregator) to further combine the sets of aggregated touchpoint data from the plurality of intermediate nodes.

Additionally, as mentioned above, the attribution segmentation system can generate digital attribution reports for segments of touchpoint data specified by a user (i.e., an administrator) at query time. In particular, the attribution segmentation system provides, to a client device of an administrator, a user interface that provides selectable options indicating one or more segments that can be applied to the touchpoint data. The administrator can select one or more of the segments to use in a query. In response, the attribution segmentation system can retrieve subsets of touchpoint data associated with the user-specified segment from the nodes of the attribution database. For example, if the administrator specified that the digital attribution report should only display data related to mobile customers, the attribution segmentation system would only retrieve subsets of touchpoint data associated with customers who have interacted with the relevant digital content through a mobile device. The attribution segmentation system can then use the aggregator to combine the subsets of touchpoint data (i.e., combine touch point data corresponding to the same dimension value) and generate a digital attribution report based on the combined data. As mentioned, in one or more embodiments, the attribution segmentation system generates a second digital attribution report for a user-specified segment represented in a first digital attribution report.

Similarly, the attribution segmentation system can generate digital attribution reports using an attribution model specified by the administrator at query time. In particular, the administrator can use the user interface provided by the attribution segmentation system to select an attribution model to submit as part of the query. In response, the attribution segmentation system retrieves the subsets of touchpoint data associated with the user-specified segment in accordance with the user-specified attribution model. For example, a query can request a digital attribution report for mobile customers in accordance with a first touch attribution model. Consequently, the attribution segmentation system retrieves subsets of data from the nodes associated with mobile customers and also qualify as a first touchpoint. By retrieving and combining the data, the attribution segmentation system performs attribution modeling for the user-specified segment of touchpoint data using the user-specified attribution model.

The attribution segmentation system provides several advantages over conventional systems. For example, the attribution segmentation system improves the flexibility with which attribution models are applied. In particular, the attribution segmentation system stores data without regard to any particular attribution model or segment. Consequently, the attribution segmentation system can apply any attribution model to any segment identified at query time. For example, the attribution segmentation system can store every touchpoint (i.e., interaction) experienced by any type of user (or users using any type of device) in a node of the database. Having the raw data allows the attribution segmentation system to perform on-demand attribution analysis for any segment using any attribution model. Therefore, touchpoint data is available for application of a first touch model or a last touch model, a more complex model (e.g., a J curve model or time decay model), a custom model, etc. Additionally, by allowing the administrator to specify segments of touchpoint data when submitting the query, the attribution segmentation system can flexibly accommodate deeper analysis or fast and responsive evaluation.

Further, the attribution segmentation system improves efficiency. In particular, by storing touchpoint data without regard to any particular attribution model and delaying processing of the data until a query has been received, the attribution segmentation system avoids a need to pre-configure or reconfigure the attribution database to accommodate new queries. Consequently, the attribution segmentation system improves the efficiency of implementing computer systems by requiring less processing power and time during operation.

In addition to the foregoing, the structure of the backend (e.g., database) of the attribution segmentation system allows for increased speed. In particular, performing an attribution analysis for a website or native application can involve the processing of billions of pieces of data. Furthermore, conventional system often store such data in a distributed architecture and/or in non-relational databases. Due to the amount of data and such architectures, the amount of time to run a query time attribution report can be substantial and prohibitive due to the need of node cross-talk and other time consuming data retrieval processes. As such, and as previously discussed, the time required to perform query time attributing modeling using conventional system make query time attributing modeling unfeasible. In contrast, the structure of the backend (e.g., database) of the query-time attribution system allows for fast and efficient query-time attribution modeling. In particular, by storing touchpoint data for a single (or a limited number) of users in each node, the attribution segmentation system eliminates the need for node cross-talk and ensures that each node can essentially instantaneously (e.g., in milliseconds) retrieve and forward to an aggregator the data applicable to an attribution query. The aggregator can then combine the applicable data so as to build an attribution report. Thus, despite having to processes large numbers of data, the structure of the attribution segmentation system allows for fast and flexible query-time attribution modeling.

Furthermore, the structure of the backend of the attribution segmentation system allows for greater flexibility and for deeper analysis. As mentioned above, the structure of the backend of the attribution segmentation system allows for the quick processing of on-demand attribution analyses. Furthermore, the structure of the backend of the attribution segmentation system allows for further analysis of an attribution report by allowing for segmentation analyses of the attribution report without requiring significant processing time or computing resources. For example, the attribution segmentation system can quickly determine the attribution of one or more segments using the same or differing attribution models. Thus, the attribution segmentation system allows for on-demand, real time analyses that provide a deeper and more complete view into attribution performance than conventional systems.

As illustrated by the foregoing discussion, the present disclosure utilizes a variety of terms describing features and benefits of the attribution segmentation system. Additional detail is now provided regarding the meaning of these terms. For example, as used herein, a "dimension" refers to a set, category, or classification of values for organizing or attributing underlying data (e.g., a set of values for analyzing, grouping, or comparing event data). In some embodiments, a dimension refers to non-numeric characteristics (e.g., characteristics of one or more digital content campaigns) that correlate, relate, or classify events. Dimensions include, but are not limited to, distribution channels, webpages, campaigns, custom eVars, dates, pages, or page names. Relatedly, a "dimension value" refers to a particular item, value, or component in a dimension. For example, a dimension value can be a particular distribution channel, webpage, campaign, custom eVar, date, page, or page name.

As a particular example of a dimension, a "distribution channel" can refer to a medium, channel, outlet, or method by which a user can access or receive information. For example, a distribution channel can include a medium by which a user purchases a product or observes a video related to a service. Distribution channels include, but are not necessarily limited to, email, referring domains (e.g., websites that include a link to a webpage of the digital content provider), display (e.g., banner advertisements), social media, organic search (e.g., where a search engine ranks a web site of the digital content provider without the digital content provider paying for the listing), paid search, or direct access (e.g., directly accessing a website).

As used herein, the term "touchpoint" refers to an interaction between two entities that can be tracked and stored. In particular, a touchpoint refers to an exposure of a user to digital content associated with a digital content provider (e.g., a business or company). For example, a touchpoint can refer to receiving an email, viewing an advertisement for the digital content provider, visiting a webpage or social network page managed by the digital content provider, or viewing a link to a webpage or social network page of the digital content provider whether as a result of an organic search, a paid search, or a link provided by a third party (i.e., a referring domain). As a non-limiting example, touchpoints can occur through distribution channels.

Further, as used herein, the term "touchpoint data" refers to digital data representing touchpoints. In particular, when a user is exposed to digital content associated with a digital content provider, the attribution segmentation system can store, into an attribution database accessible or available to that digital content provider, touchpoint data corresponding to the particular touchpoint. For example, an instance of touchpoint data can include an indication of a touchpoint and a timestamp associated with the touchpoint indicating when the touchpoint occurred.

Additionally, as used herein, the term "segment" refers to touchpoint data corresponding to a particular quality or characteristic. In particular, a segment can include one or more subsets of touchpoint data having instances of touchpoint data that share at least one common characteristic. For example, a segment can include one or more subsets of touchpoint data associated with users of a particular user type (e.g., age range, geographic location, gender, interests, etc.), one or more subsets of touchpoint data associated with use of a particular device type (e.g., mobile users, tablet users, desktop users, etc.), or one or more subsets of touchpoint data associated with a particular product (e.g., product category, product ID, or product name), etc. Thus, a segment can comprise a subset of visitors, visits, or hits based on characteristics or interactions.

Further, as used herein, the term "event" refers to a quantifiable action performed by a user or a quantifiable result of an action by a user. In some cases, an event includes a discrete quantifiable action (or result of an action) taken by a visitor on a network platform, such as in a software application or a on website. For example, an event can include, but is not limited to, an application download, an application use, a click, a click-through, a conversion, an order, a purchase, a webpage view, a web search, an instance of a quantity of time spent on a given webpage, a first time visit, a visitor from a search engine or a social networking site, a transaction resulting in a quantity of revenue, or a quantity of revenue over a certain amount.

Additionally, as used herein, the term "attribution" refers to a measure of causation, credit, contribution, responsibility, or influence (in whole or in part) between a factor or variable and a result. In particular, attribution can include an assignment of credit or influence to a dimension value for an event. For instance, attribution can refer to determining that digital content distributed through email are responsible for a particular percentage of overall purchases of a given product (i.e., the dimension value of email is wholly or partially responsible for particular purchase events).

Further, as used herein, the term "digital attribution report" refers to a digital description of an attribution. In particular, a digital attribution report provides attribution results (i.e., a description of the credit or influence assigned to one or more dimension values for an event resulting from the application of an attribution model). As an example, a digital attribution report can provide a description of the credit or influence assigned to each distribution channel from a plurality of distribution channels. A digital attribution report can provide the attribution results using a textual description, a visual description (e.g., charts and graphs), or an audio description.

Additionally, as used herein, the term "attribution model" as used herein refers to a computer-based algorithm or rule set that determines an attribution or attribution distribution. In particular, an attribution model includes a computer-implemented algorithm that determines a measure of causation, credit, contribution, influence, or responsibility between a factor (e.g., a dimension value) and a result (e.g., an event), where multiple factors may contribute to the result. In some embodiments, an attribution model employs machine learning or statistical models to determine weights (e.g., using a regression analysis). In other embodiments, an attribution model is rule-based by using predetermined weights based on rules. The attribution segmentation system can train an attribution model based on observations that incorporate a discrete-time survival model, which is a type of time-to-event model. In addition, the attribution segmentation system can create a supervised learning model (e.g., via machine learning).

Attribution models include, for example, a first touch model, a last touch model, a linear model, a participation model, a same touch model, a U-shaped model, J curve model, an inverse J model, a time decay model, and a custom model. A first touch attribution model assigns all the credit of success to a first channel (or other dimension value) with which a user engages. A last touch model assigns all credit to the last channel (or other dimension value) with which a user engages. A linear model applies equal weight to all dimension values (e.g., distribution channels). A participation model assigns equal credit to every unique dimension value. A same touch model assigns all credit to the dimension value where a result (e.g., conversion) occurs. A U-shaped model assigns particular percentages of credit to dimension values of two key touchpoints—the first touch and the lead creation—as well as those values of any touchpoints in between the two. A J curve model assigns particular percentages of credit to the values of the first and last touchpoints (e.g., 20% to the first and 60% to the last) and spreads the remaining percentage across any dimension values of additional touchpoints. An inverse J model is the inverse of the J curve model where, for example, 60% of the credit is assigned to the dimension value of the first touchpoint and 20% is assigned to the last. A time decay model assigns credit according to the length of time between touchpoints or between a touchpoint and a result (e.g., a conversion), where dimension values of more recent touchpoints are weighted heavier than those of older touchpoints which may not have been as impactful on a given result. A custom model attributes credit according to user-defined parameters or settings. Indeed, the attribution segmentation system can receive user input within a user interface to define a custom attribution model.

Additional detail regarding the attribution segmentation system will now be provided with reference to the figures. For example, FIG. 1 illustrates a schematic diagram of an environment 100 in which an attribution segmentation system 128 operates. As illustrated in FIG. 1, the environment 100 can include a server(s) 102, an attribution database 108, client devices 110a-110n associated with users 114a-114n, an administrator device 116 associated with an administrator 120, a third-party network server(s) 122, and a network 124.

Although the environment 100 of FIG. 1 is depicted as having a particular number of components, the environment 100 can have any number of additional or alternative components (e.g., any number of servers, client devices, administrator devices, databases, or other components in communication with the attribution segmentation system 128 via the network 124). Similarly, although FIG. 1 illustrates a particular arrangement of the server(s) 102, the attribution database 108, the client devices 110a-110n, the users 114a-114n, the administrator device 116, the administrator 120, the third-party network server(s) 122, and the network 124, various additional arrangements are possible.

The server(s) 102, the attribution database 108, the client devices 110a-110n, the administrator device 116, the third-party network server(s) 122, and the network 124 may be communicatively coupled with each other either directly or indirectly (e.g., through the network 124, networks are discussed with greater detail below in relation to FIG. 13). Moreover, the server(s) 102, the client devices 110a-110n, the administrator device 116, and the third-party network server(s) 122 may include a computing device (including one or more computing devices as discussed in greater detail below in relation to FIG. 13).

As mentioned above, the environment 100 includes the server(s) 102. The server(s) 102 can generate, store, receive, and/or transmit data, including data regarding touchpoints, events, or digital attribution reports. For example, the server(s) 102 can receive touchpoint data from the client device 110a (e.g., via the third-party network server 122) and transmit a digital attribution report to the administrator device 116. In one or more embodiments, the server(s) 102 comprises a data or content server. The server(s) 102 can also comprise an application server, a communication server, a web-hosting server, a social networking server, or a digital content campaign server.

As shown in FIG. 1, the server(s) 102 can include an analytics system 104. In particular, the analytics system 104 can collect touchpoint data. For example, the analytics system 104 can collect touchpoint data associated with a particular user. The analytics system 104 can collect the touchpoint data in a variety of ways. For example, in one or more embodiments, the analytics system 104 causes the server(s) 102 and/or the third-party network server(s) 122 to track users' touchpoint data and report the tracked touchpoint data for storage on the attribution database 108. To illustrate, the third-party network server(s) 122 can include an email server that distributes emails from a digital content provider, tracks the emails to determine that they were properly received, and reports touchpoint data corresponding to each recipient that properly received the email to the analytics system 104. In one or more embodiments, the analytics system 104 receives user data directly from the client devices 110a-110n (e.g., browser cookies, cached memory), embedded computer code (e.g., tracking pixels), a user profile, or using various types of tracking techniques. Thus, the analytics system 104 collects or otherwise receives various types of data, including data regarding interactions of the users 116a-116n web sites, emails, native mobile device software applications, etc.

Additionally, the server(s) 102 can include the query-time attribution system 106. In one or more embodiments, the query-time attribution system uses the server(s) 102 to store touchpoint data and generate digital attribution reports. As seen in FIG. 1, the query-time attribution system 106 includes the attribution segmentation system 128. In particular, in one or more embodiments, the attribution segmentation system 128 uses the server(s) 102 to store touchpoint data and generate digital attribution reports for user-specified segments. For example, the attribution segmentation system 128 can cause the server(s) 102 to receive a query that includes a user-specified segment and then generate a digital attribution report using stored touchpoint data that is associated with the user-specified segment.

For example, in one or more embodiments, the server(s) 102 can store touchpoint data in the attribution database 108. The server(s) 102 can then receive a query to generate a digital attribution report for a user-specified segment of touchpoint data based on a user-specified attribution model. In response to the query, and in real time, the server(s) 102 can communicate with the attribution database 108 to retrieve subsets of touchpoint data associated with the user-specified segment of touchpoint data using the user-specified attribution model and combine the subsets of touchpoint data. The server(s) 102 can then generate a digital attribution report based on the combined data and provide the report to a client device (e.g., the administrator device 116).

As illustrated by the previous example embodiments, the attribution segmentation system 128 can be implemented in whole, or in part, by the individual elements of the environment 100. Although FIG. 1 illustrates the attribution segmentation system 128 implemented with regards to the server(s) 102, it will be appreciated that components of the attribution segmentation system 128 can be implemented in other components of the environment 100.

In one or more embodiments, the attribution database 108 (which can also be referred to as an analytics database) stores touchpoint data relevant to generating digital attribution reports. For example, the attribution database 108 can store touchpoint data, event data, user data, or device data. The attribution database 108 will be discussed in more detail below with reference to FIGS. 9-10. Though FIG. 1 illustrates the attribution database 108 as a separate component to the analytics system 104, one or more embodiments include the attribution database 108 as a component of the server(s) 102 or the analytics system 104.

In one or more embodiments, the client devices 110a-110n include computer devices that allow users of the devices (e.g., the users 114a-114n) to be exposed to digital content associated with a digital content provider. For example, the client devices 110a-110n can include smartphones, tablets, desktop computers, laptop computers, or other electronic devices. The client devices 110a-110n can include one or more applications (e.g., the client application 112) that allow the users 114a-114n to be exposed to digital content associated with the digital content provider. For example, the client application 112 can include a software application installed on the client devices 110a-110n. Additionally, or alternatively, the client application 112 can include a software application hosted on the server(s) 102, which may be accessed by the client devices 110a-110n through another application, such as a web browser.

In one or more embodiments, the administrator device 116 includes a computer device that allows a user of the device (e.g., the administrator 120) to submit a query for and receive digital attribution reports. For example, the administrator device 116 can include a smartphone, tablet, desktop computer, laptop computer, or other electronic device. The administrator device 116 can include one or more applications (e.g., the administrator application 118) that allows the administrator 120 to submit a query for and receive digital attribution reports. For example, the administrator application 118 can include a software application installed on the administrator device 116. Additionally, or alternatively, the administrator application 118 can include a software application hosted on the server(s) 102, which may be accessed by the administrator device 116 through another application, such as a web browser.

Figure 2:
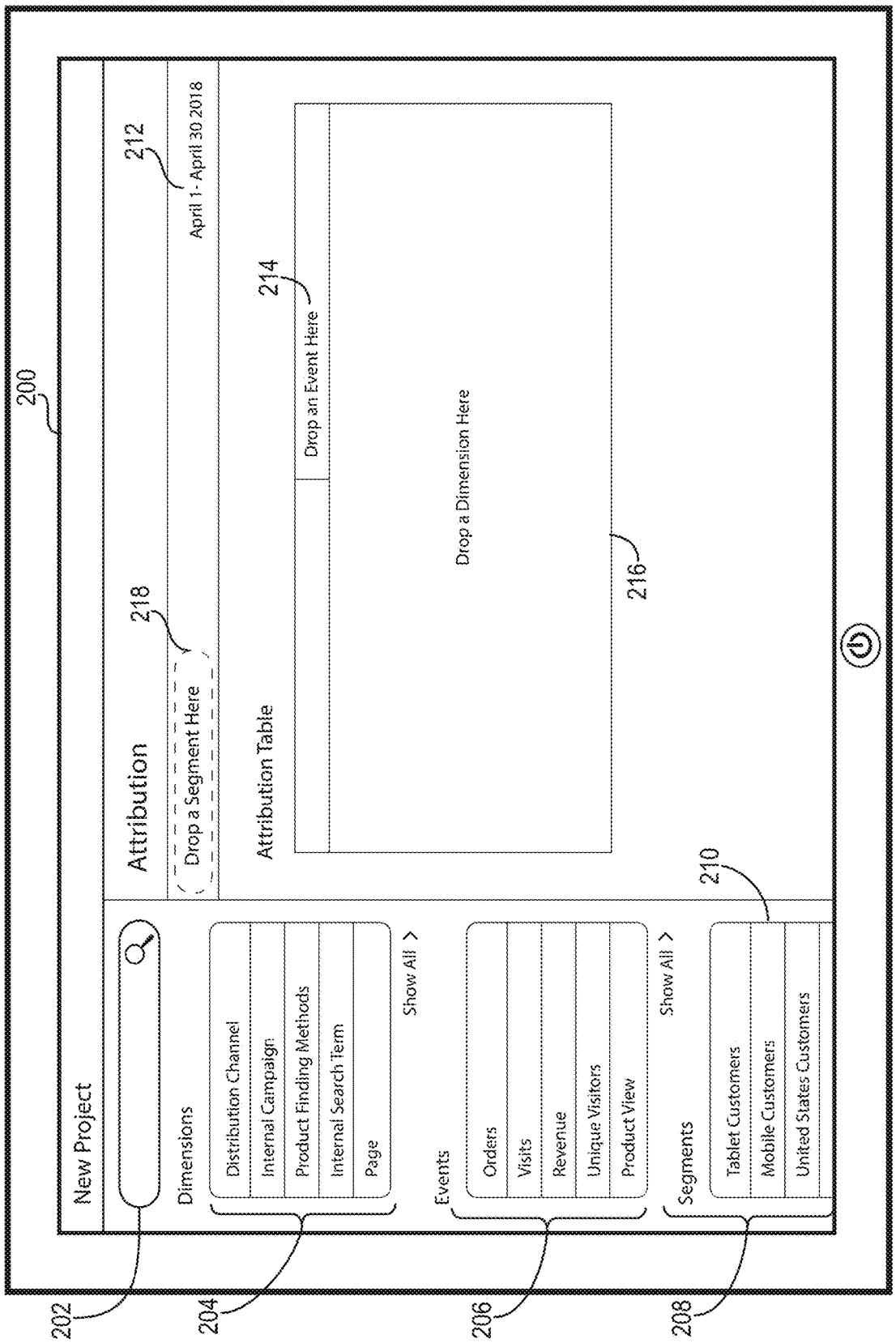
FIG. 2 illustrates a user interface provided by the attribution segmentation system for submitting a query to generate a digital attribution report in accordance with one or more embodiments.

In one or more embodiments, the attribution segmentation system 128 provides a user interface for receiving queries to generate digital attribution reports. FIG. 2 illustrates a user interface 200 that the attribution segmentation system 128 provides for display on a client device (e.g., the administrator device 116) in accordance with one or more embodiments. In particular, the user interface 200 provides a plurality of options that an administrator can select in submitting a query for a digital attribution report. As illustrated in FIG. 2, the user interface 200 includes a search bar 202, dimension options 204, event options 206, segment options 208, date window 212, an event drop target 214, a dimension drop target 216, and a segment drop target 218.

As mentioned above, the user interface 200 includes dimension options 204. In particular, the attribution segmentation system 128 provides the dimension options 204 to enable an administrator to select one or more dimensions to include in a query. In response, the attribution segmentation system 128 can generate a digital attribution report using touchpoint data that corresponds to the selected dimensions. In one or more embodiments, the attribution segmentation system 128 provides dimensions in addition to those shown. In some embodiments, the user interface 200 provides a selectable option whereby the administrator can view and select the additional dimensions. In further embodiments, attribution segmentation system 128 can search for additional dimensions based on input provided by the administrator in the search bar 202.

Additionally, the user interface 200 includes event options 206. In particular, the attribution segmentation system 128 provides the event options 206 to enable the administrator to select an event to include in a query. Consequently, the attribution segmentation system 128 generates a digital attribution report showing how the applied attribution model credits particular dimension values (i.e., dimension values of the selected dimensions) with the occurrence of the selected event. In one or more embodiments, the attribution segmentation system 128 provides events in addition to those shown. In some embodiments, the user interface 200 provides a selectable option whereby the administrator can view and select the additional events. In further embodiments, the attribution segmentation system 128 can search for additional events based on input provided by the administrator in the search bar 202.

Further, as shown in FIG. 2, the user interface 200 includes segment options 208. In particular, the attribution segmentation system 128 provides the segment options 208 to enable the administrator to select a segment to be applied to a query. Consequently, the attribution segmentation system 128 generates the digital attribution report using only touchpoint data associated with the selected segment. For example, the attribution segmentation system 128 can generate a digital attribution report using touchpoint data corresponding to users who were exposed to digital content through a mobile device in response to the administrator selecting the "Mobile Customers" segment 210. In one or more embodiments, the attribution segmentation system 128 provides segments in addition to those shown. In some embodiments, the user interface 200 provides a selectable option whereby the administrator can view and select the additional segments. In further embodiments, the attribution segmentation system 128 can search for additional segments based on input provided by the administrator to the search bar 202.

As shown in FIG. 2, the attribution segmentation system 128 further provides the date window 212 in the user interface 200. In particular, the date window 212 provides time limits on the touchpoint data used when generating digital attribution reports. For example, in response to an administrator setting the date window 212 from Apr. 1-Apr. 30, 2018 as shown in FIG. 2, the attribution segmentation system 128 can limit the touchpoint data used in generating a digital attribution report to touchpoint data that is relevant to those dates (i.e., falling within those dates or corresponding to an event that falls within those dates). The attribution segmentation system 128 can determine whether an instance of touchpoint data falls within the established date range included within the date window 212 by comparing the date range with a timestamp of the instance of touchpoint data. In one or more embodiments, the administrator can modify the applicable date range by selecting (e.g., clicking) the date window 212 and selecting a new date range. In some embodiments, the administrator can modify the date range included in the date window 212 after a digital attribution report has been generated, and the attribution segmentation system 128 can generate a new digital attribution report using the modified date range (i.e., modification of the date range submits a new query to generate a new digital attribution report).

As illustrated in FIG. 2, the attribution segmentation system 128 further provides the event drop target 214 in the user interface 200. In one or more embodiments, the attribution segmentation system 128 can include an event in an attribution query/report based on detecting a selection, by an administrator, of an event from the event options 206 (or from a list resulting from a search using the search bar 202) and optionally in response to detecting a dragging of the selected event to the event drop target 214.

Similarly, in one or more embodiments, the attribution segmentation system 128 includes a dimension in a query to generate a digital attribution report in response to detecting a selection of a dimension from the dimension options 204 (or from a list resulting from a search using the search bar 202) and optionally in response to detecting a dragging of the selected dimension to the dimension drop target 216.

Likewise, in one or more embodiments, the attribution segmentation system 128 includes a segment in a query to generate a digital attribution report in response to detection a selection of a segment from the segment options 208 (or from a list resulting from a search using the search bar 202) and optionally in response to detecting a dragging of the selected segment to the segment drop target 218.

In one or more embodiments, the attribution segmentation system 128 receives a query to generate a digital attribution report by receiving a user-specified dimension. The query can also include an attribution model that is either a default attribution model or a user-specified attribution model. Selecting a user-specified attribution model to submit as part of a query will be discussed in more detail below with reference to FIGS. 5-6C. In some embodiments, the query can further include a user-specified event. In further embodiments, the query also includes a user-specified segment. Though discussion with reference to FIGS. 3-4 discusses use of a default attribution model in generating digital attribution reports, it should be noted that the attribution segmentation system 128 can include a default setting for any of the attribution variables (i.e., dimension, event, segment, or attribution model) and modify any of the variables in response to a selection by the administrator.

Figure 3:
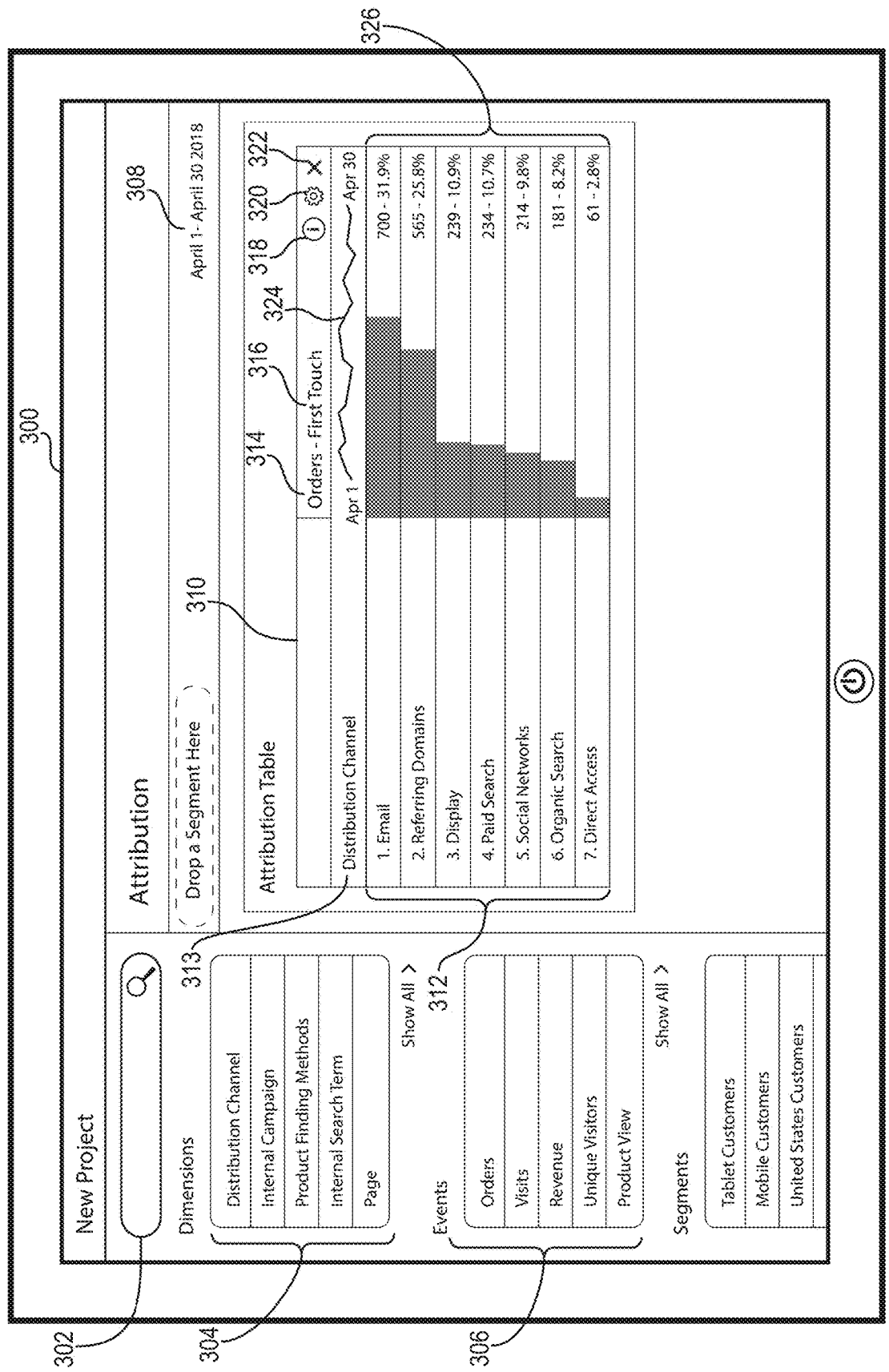
FIG. 3 illustrates a user interface displaying a digital attribution report in accordance with one or more embodiments.

In one or more embodiments, the attribution segmentation system 128 includes a segment as part of an initial (i.e., first) query; however, the following discussion will focus primarily on using a segment to filter attribution results presented within a first digital attribution report. In other words, in some embodiments, the attribution segmentation system 128 can present, in response to a first query, a first digital attribution report for a user-specified dimension based on an attribution model (i.e., a default or use-specified attribution model). The attribution segmentation system 128 can then receive a second query to generate a second digital attribution report for a user-specified segment represented in the first digital attribution report. Consequently, the attribution segmentation system 128 can generate and provide the second digital attribution report to provide a deeper analysis of the attribution of the first digital attribution report. FIG. 3 illustrates a user interface 300 provided by the attribution segmentation system 128 after detecting parameters for an attribution query as described above in relation to FIG. 2. In particular, the user interface 300 is similar to the user interface 200 of FIG. 2, except that the user interface 300 provides the digital attribution report 310 generated in response to receiving a query. In particular, the digital attribution report 310 includes a set of dimension value indicators 312 corresponding to a dimension indicator 313, an event indicator 314, an attribution model indicator 316, an information option 318, a settings option 320, a deselect option 322, an event performance graph 324, and an attribution display 326.

The attribution segmentation system 128 indicates dimension values using the set of dimension value indicators 312. In particular the dimension values correspond to a dimension selected by an administrator from the dimension options 304 (or from a list resulting from a search using the search bar 302) as indicated by the dimension indicator 313. For example, as shown in FIG. 3, the set of dimension value indicators 312 includes a plurality of channels in response to the administrator selecting the "distribution channels" dimension. In particular, the set of dimension value indicators 312 includes indicators for an "email" channel, a "referring domains" channel, a "display" channel, a "paid search" channel, a "social networks" channel, an "organic search" channel, and a "direct access" channel. In one or more embodiments, the attribution segmentation system 128 orders the dimension value indicators within the set of dimension value indicators 312 based on the attribution distribution provided within the attribution display 326 (e.g., orders the dimension value indicators to place the indicator corresponding to the most credited dimension value at the top and the indicator corresponding to the least credited dimension value at the bottom).

Similarly, the attribution segmentation system 128 indicates an event selected by the administrator from the event options 306 (or from a list resulting from a search using the search bar 302) using the event indicator 314. In particular, the attribution segmentation system 128 provides the digital attribution report 310 to illustrate the influence of the dimension values corresponding to the set of dimension value indicators 312 on the occurrence of the event indicated by the event indicator 314. For example, as shown in FIG. 3, the event indicator 314 shows that the administrator selected the "orders" event, indicating that the digital attribution report 310 illustrates how the distribution channels named above affected or influenced customer orders.

The attribution segmentation system 128 provides the attribution model indicator 316 to indicate the attribution model applied to subsets of touchpoint data corresponding to the dimension indicated by the dimension indicator 313. As shown in FIG. 3, the attribution segmentation system 128 applies a default attribution model (e.g., a first touch model) to the subsets of touchpoint data. Some embodiments involve waiting for a user-specified attribution model before generating a digital attribution report.

The attribution segmentation system 128 uses the information option 318 to provide a textual, audio, and/or graphical description of one or more features of the digital attribution report 310. For example, the information option 318 can provide a description of the event indicated by the event indicator 314 (e.g., provide a definition of the event). Additionally, or alternatively, the information option 318 can provide a description of the attribution model indicated by the attribution model indicator 316. The attribution segmentation system 128 uses the settings option 320 to provide one or more selectable options, which when selected, cause the attribution segmentation system 128 to modify the presentation of the digital attribution report 310 or the attribution model applied as will be discussed in more detail below with regards to FIG. 5. In one or more embodiments, when the attribution segmentation system 128 detects a selection of the deselect option 322, the attribution segmentation system 128 deselects the event portrayed by the event indicator 314 or the attribution model portrayed by the attribution model indicator 316. In some embodiments, in response to detecting a selection of the deselect option 322, the attribution segmentation system 128 deletes or hides the digital attribution report 310 entirely.

To provide a broad look at the occurrence of the event indicated by the event indicator 314 throughout the time period defined by the date window 308, the attribution segmentation system 128 provides an event performance graph 324. For example, as shown in FIG. 3, the event performance graph 324 provides a line graph representing how many orders have been received throughout the month of April (e.g., the date range provided in the date window 308). In one or more embodiments, attribution segmentation system 128 can modify the event performance graph 324 to provide a different graphical representation (e.g., a bar graph) of the occurrence of the event in response to input by the administrator.

The attribution display 326, generated by the attribution segmentation system 128, includes a graph that provides a graphical representation of the attribution results obtained from application of the attribution model indicated by the attribution model indicator 316. In particular, the attribution display 326 shows the credit assigned to each dimension value portrayed by the set of dimension value indicators 312. For example, as shown in FIG. 3, the attribution display 326 shows the credit assigned to each distribution channel for orders received in the month of April according to a first touch attribution model. To illustrate, the attribution display 326 shows that the first touch model attributed the most credit for orders received in the month of April to the email channel. In some embodiments, the attribution display 326 shows the credit attributed for orders using a different value, such as a dollar amount associated with the credited orders.

Figure 4:
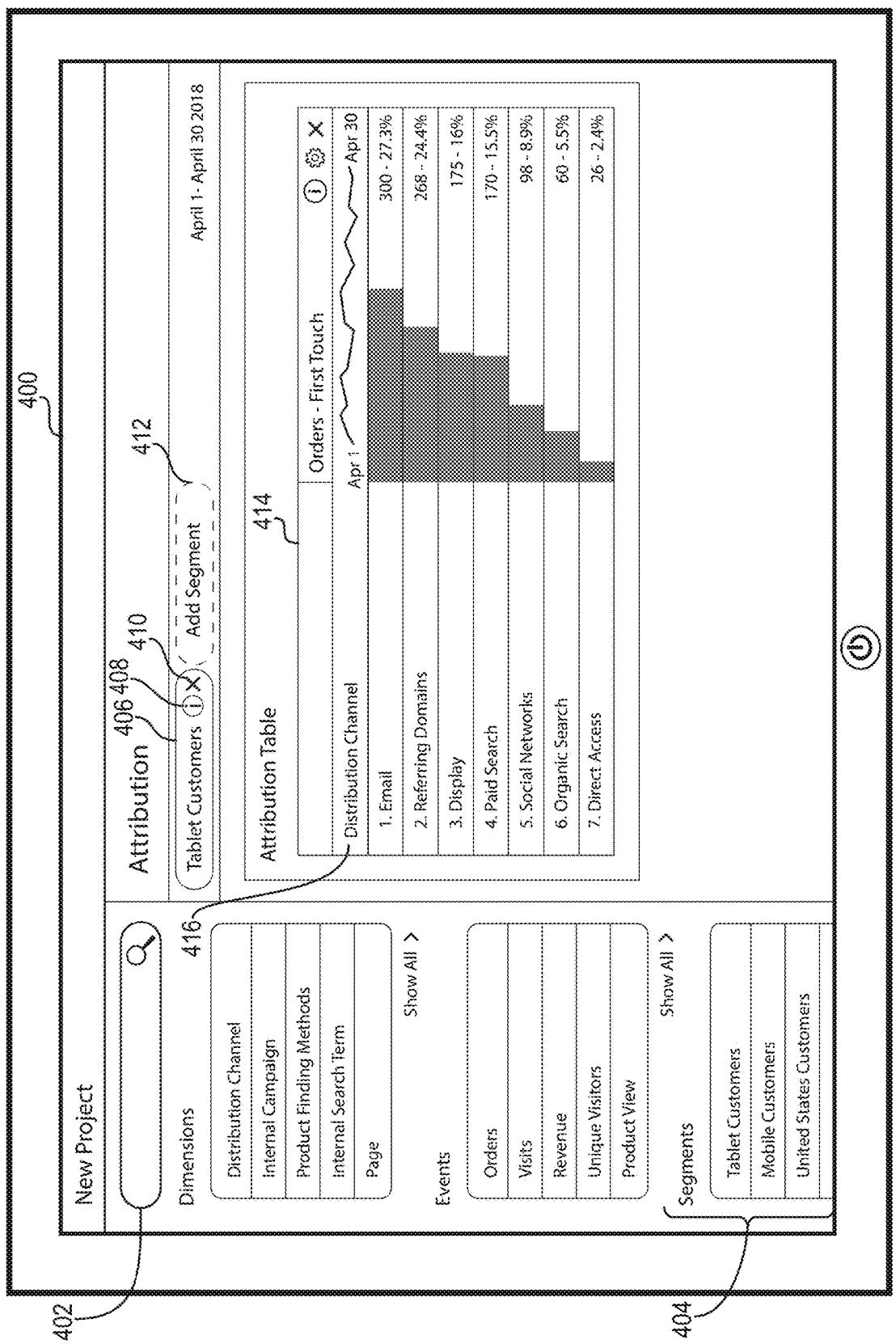
FIG. 4 illustrates a user interface displaying a second digital attribution report for a user-specified segment reflected in a first digital attribution report in accordance with one or more embodiments.

As mentioned above, in one or more embodiments, after generating a digital attribution report, the attribution segmentation system 128 can provide deeper analyses by showing the attribution of one or more segments represented in a digital attribution report. Upon detecting a selection of a segment, the attribution segmentation system 128 generates an additional digital attribution report (i.e., a "second digital attribution report") for the user-specified segment represented in the initial digital attribution report (i.e., the "first digital attribution report"). FIG. 4 illustrates the attribution segmentation system 128 providing a user interface 400 to display a second digital attribution report 414 for a user-specified segment represented in a first digital attribution report (i.e., the digital attribution report 310 of FIG. 3) in accordance with one or more embodiments.

As shown in FIG. 4, the attribution segmentation system 128 provides a segment indicator 406 within the user interface 400 includes a segment indicator 406 to indicate a segment selected by the administrator from the segment options 404 (or from a list resulting from a search using the search bar 402). Within the segment indicator 406, the attribution segmentation system 128 provides a segment information option 408—to provide a description of the indicated segment—and a segment deselect option 410 to remove the segment from the second digital attribution report 414. As shown in FIG. 4, the segment indicator 406 includes the "tablet customers" segment, indicating that the second digital attribution report 414 displays only those results corresponding to the tablet customers reflected in the first digital attribution report. Though FIG. 4 shows the segment indicator 406 positioned outside of the second digital attribution report 414, in some embodiments, the user interface 400 positions the segment indicator 406 within the second digital attribution report 414 as will be shown below with reference to FIGS. 7-8.

Additionally, as shown in FIG. 4, the attribution segmentation system 128 further provides an additional segment drop target 412 within the user interface 400. In one or more embodiments, the user interface 400 displays the additional segment drop target 412 after the administrator has selected a first segment. Indeed, in one or more embodiments, the attribution segmentation system 128 enables an administrator to select a second segment. In response to detecting a selection of a second segment, the attribution segmentation system 128 generates a third digital attribution report for the first and second user-specified segments represented in the first digital attribution report (i.e., the digital attribution report 310). In one or more embodiments, the attribution segmentation system 128 uses the second user-specified segment to further narrow the first user-specified segment. For example, in response to a selection of a "tablet customers" segment and a "female customers" tablet, the attribution segmentation system 128 can generate a third digital attribution report for the female tablet customers represented in the first digital attribution report. In some embodiments, the second user-specified segment operates to add to the first user-specified segment. For example, in response to a selection of a "customers between 25-34" segment and a "customers between 35-44" segment, the attribution segmentation system 128 can generate a third digital attribution report for the "customers between 25-44" represented in the first digital attribution report. In one or more embodiments, the attribution segmentation system 128 enables the administrator to select any number of segments.

The attribution segmentation system 128 provides the second digital attribution report 414 to provide attribution results for the user-specified segment—indicated by the segment indicator 406—represented in a first digital (i.e., the digital attribution report 310). In particular, the second digital attribution report 414 illustrates how the user-specified dimension—indicated by the dimension indicator 416—performs when evaluated specifically for the user-specified segment. For example, comparing the second digital attribution report 414 to the digital attribution report 310 shows that tablet customers accounted for about half of the orders received in the month of April. Further, the comparison shows that the performance of a dimension value associated with the user-specified dimension may become more precisely shown when evaluated under a particular segment than shown when evaluated with regards to all touchpoint data used to generate the digital attribution report 310. To illustrate, the second digital attribution report 414 shows that the display channel accounts for 16% of the orders received by tablet customers—an increase from the 10.9% attribution shown by the digital attribution report 310. Therefore, by allowing an administrator to submit user-specified segments, the attribution segmentation system 128 enables the administrator to evaluate the performance of a dimension under various parameters.

Figure 5:
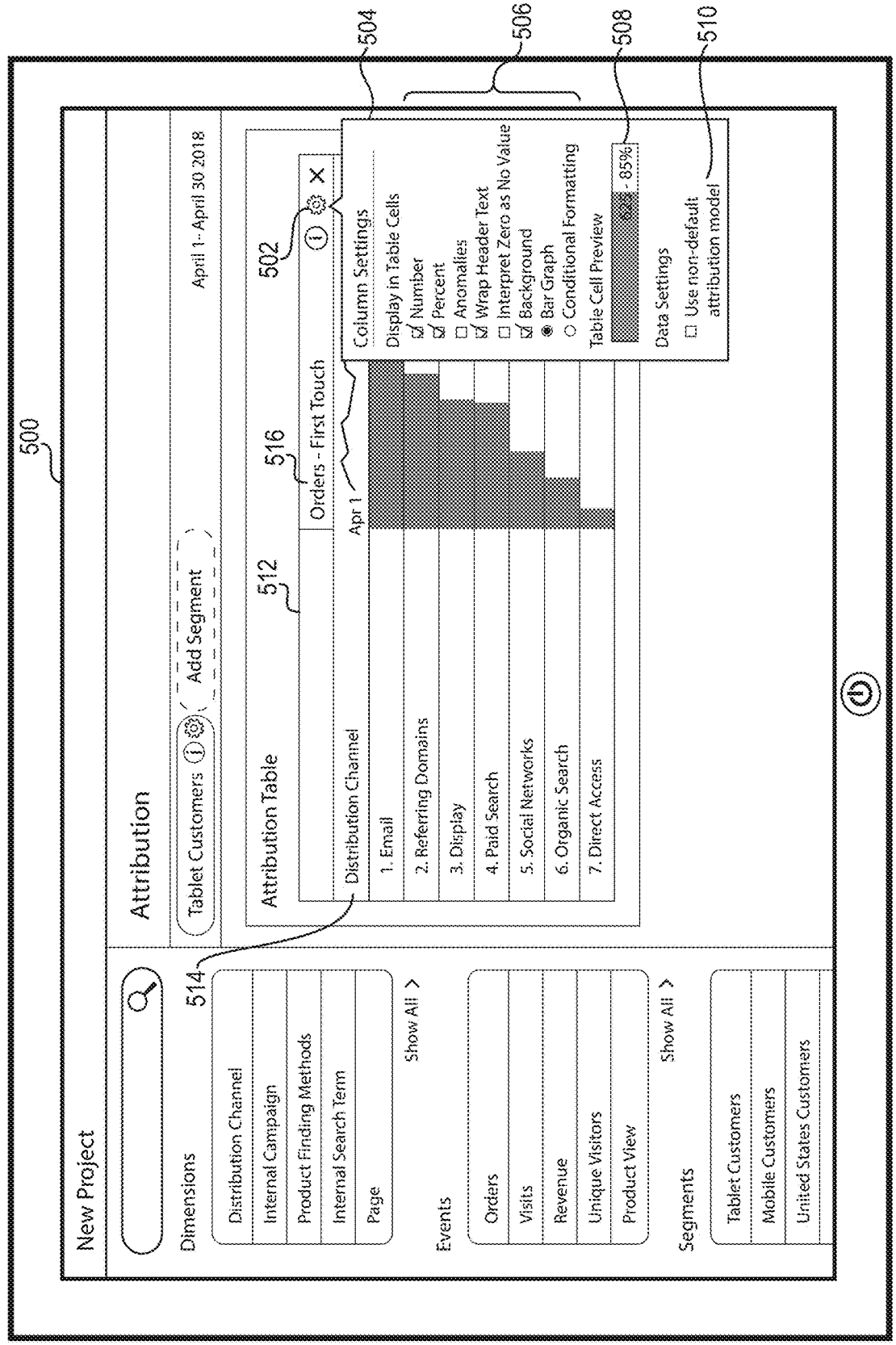
FIG. 5 illustrates a user interface displaying a settings window that provides options for editing a digital attribution report in accordance with one or more embodiments.

As mentioned above, in one or more embodiments, the attribution segmentation system 128 generates a digital attribution report based on a user-specified attribution model specified as part of the query to generate a digital attribution report. FIG. 5 illustrates a user interface 500 provided by the attribution segmentation system 128, including a settings window 504 providing various options to the administrator, including the option to select an attribution model. In one or more embodiments, the attribution segmentation system 128 provides the settings window 504 in response to an administrator selection of the settings option 502.

As illustrated in FIG. 5, the settings window 504 provides a plurality of visualization options 506 by which an administrator can modify the visual presentation provided by the digital attribution report 512. For example, the administrator can select or deselect one or more options that cause the digital attribution report 512 to include or exclude particular data, respectively (e.g., "numbers" or "percent"). Additionally, the settings window 504 can include the table cell preview 508 that provides an example of the visualization that will be provided by the digital attribution report 512 based on the chosen visualization options.

Further, the settings window 504 includes the attribution model option 510. Upon selection of the attribution model option 510, the query time attribution system 106 enables the administrator to select a user-specified attribution model. Where the administrator has previously submitted a user-specified attribution model, the attribution model option 510 will indicate (i.e., with a checkmark) that a non-default attribution model has already been applied. Consequently, the settings window 504 can further provide a selectable option (not shown) that enables the administrator to modify or change the currently selected attribution model. In one or more embodiments, in response to detecting a modification to the currently selected attribution model or a submission of a new attribution model (e.g., by selection of a different user-specified attribution model) the attribution segmentation system 128 can recognize a new query for which to generate a digital attribution report. In particular, the new query will include the user-specified attribution model as well as the user-specified dimension indicated by the dimension indicator 514 and the user-specified event indicated by the event indicator 516.

Figure 6A:
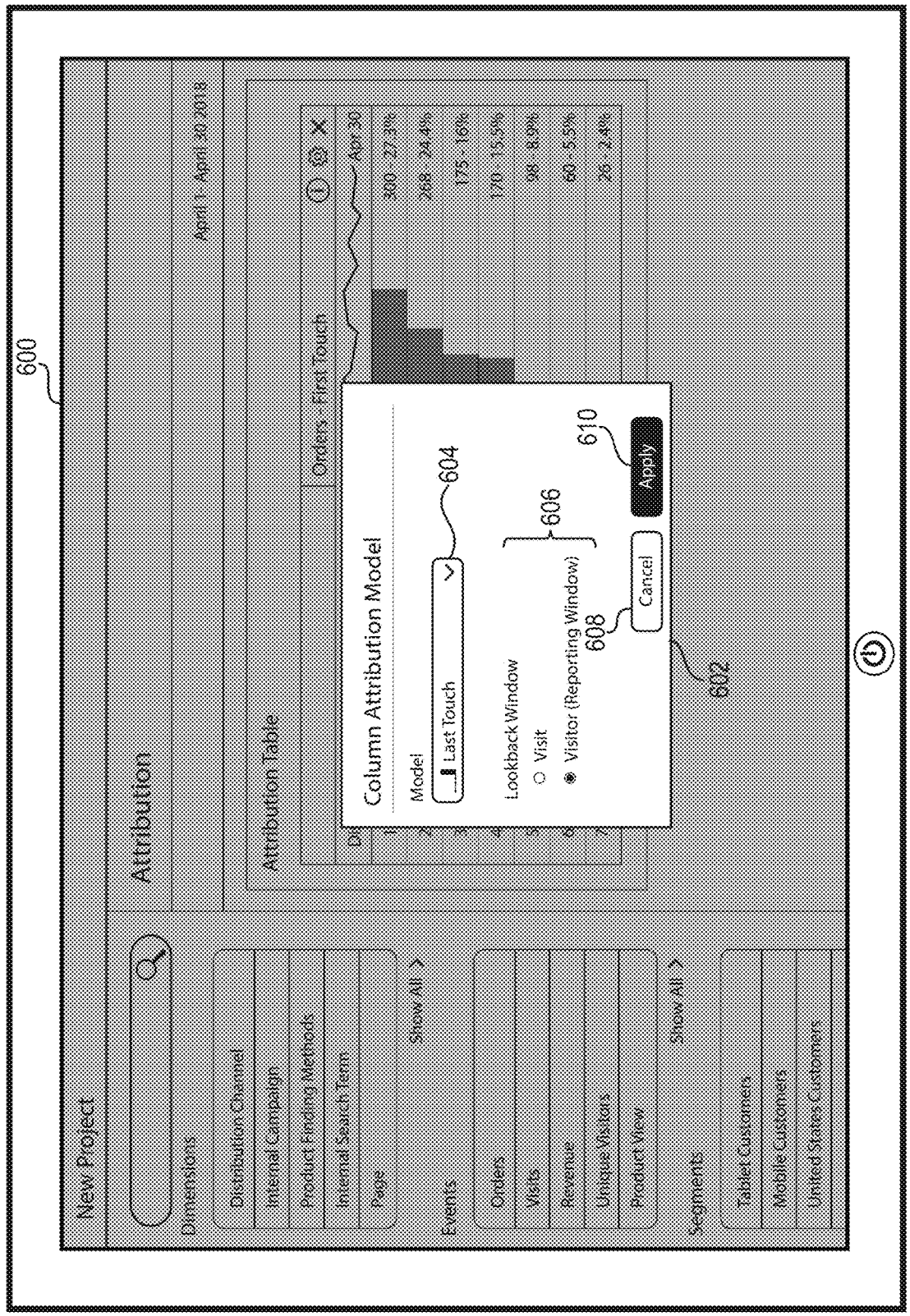
FIGS. 6A-6C illustrate a user interface displaying an attribution model selection window that provides options for selecting, changing, or modifying attribution models in accordance with one or more embodiments.
Figure 6B:
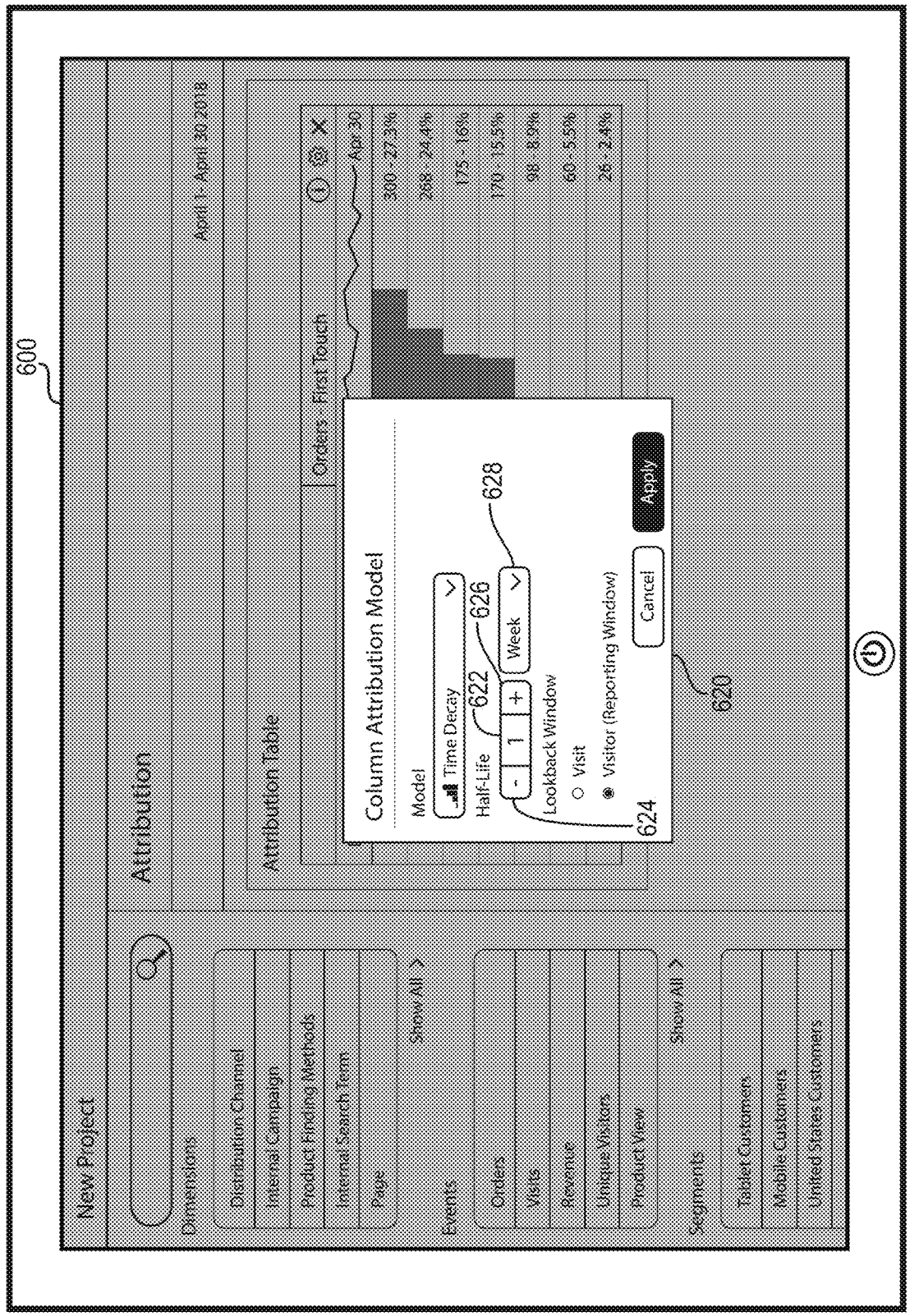
Figure 6C:
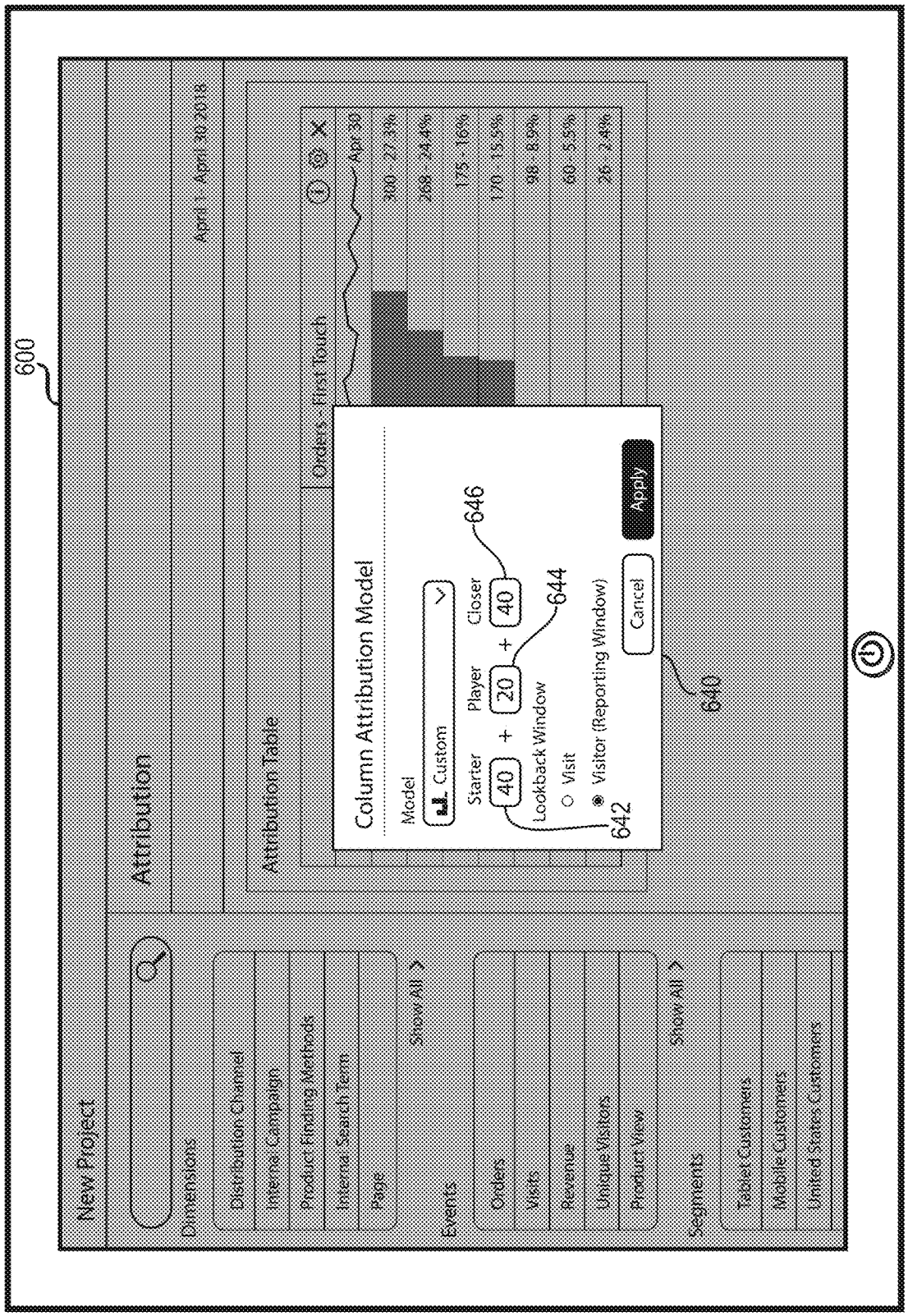

Indeed, upon receiving a selection of the attribution model option 510 or the selectable option enabling the user to modify or change the currently selected attribution model, the attribution segmentation system 128 provides a window enabling the administrator to select a new attribution model or modify a currently applied attribution model. FIGS. 6A-6C illustrate the query-time attribution system 106 providing attribution model selection windows that enable an administrator to select or modify attribution models.

For example, FIG. 6A illustrates the attribution segmentation system 128 providing a user interface 600 including an attribution model selection window 602. In particular, the attribution model selection window 602 includes an attribution model selection menu 604, lookback window options 606, a cancel button 608, and an accept button 610. The attribution model selection window 602 enables an administrator to select one of the available attribution models to apply to the user-specified dimension and the user-specified event. As illustrated in FIG. 6A, the attribution model selection menu 604 shows the attribution model that is currently applied (e.g., the default attribution model or the previously selected attribution model). In one or more embodiments, in response to detecting a selection of the attribution model selection menu 604, the attribution segmentation system 128 provides a drop-down menu listing all of the available attribution models.

As shown in FIG. 6A, the lookback window options 606 enable a user to select either a visit lookback window or a visitor lookback window. When "visit lookback" is selected, the attribution segmentation system 128 applies the selected attribution model to the stored touchpoint data on a per visit basis. When "visitor lookback" is selected, the attribution segmentation system 128 applies the selected attribution model to the stored touchpoint data on a visitor basis.

The cancel button 608 allows the administrator to cancel an attribution model selection or modification, causing the attribution segmentation system 128 to retain the previous attribution model settings. Selection of the accept button 610 submits a new query that includes the newly selected or modified attribution model. In response, the attribution segmentation system 128 applies the newly selected or modified attribution model to the stored touchpoint data as will be discussed in more detail below with reference to FIGS. 9-10. The attribution segmentation system 128 then generates a new digital attribution report—reflecting the results of the new query—and provides the new digital attribution report to the client device of the administrator.

FIG. 6B illustrates the attribution segmentation system 128 providing an attribution model selection window 620. The attribution model selection window 620 is similar to the attribution model selection window 602 of FIG. 6A but provides additional user-selectable options that correspond to the time-decay attribution model. In particular, the attribution model selection window 620 provides the half-life numeral adjuster 622 and the half-life metric adjuster 628. The attribution segmentation system 128 can decrease or increase the numerical value of the half-life used by the half-life attribution model in response to detecting a selection of either the subtract button 624 or the add button 626, respectively. The attribution segmentation system 128 can additionally change the metric by which the half-life will be measured in response to detecting input at the half-life metric adjuster 628. For example, the attribution segmentation system 128 can use the half-life metric adjuster 628 to define the half-life to be measured in years, months, weeks, days, hours, etc. In response to the selections made in the attribution model selection window 520, the attribution segmentation system 128 can generate a new attribution report using an attribution model based on the detected selections.

FIG. 6C illustrates attribution segmentation system 128 providing another attribution model selection window 640. As seen in FIG. 6C, the attribution model selection window 640 provides user-selectable options that correspond to a custom attribution model. In particular, the attribution model selection window 640 provides a first touch weight window 642, a mid-touch weight window 644, and a last touch weight window 646. By entering or modifying values in each of the weight windows, an administrator can customize the weights applied by the custom attribution model to each of the respective touches. In particular, the custom attribution model applies the value entered into the mid-touch weight window 644 to every applicable touchpoint that is neither a first touchpoint nor a last touchpoint. In one or more embodiments, the attribution model selection window 640 allows an administrator to enter any combination of values in the weight windows (e.g., any combination of values adding up to 100). In response to the selections made in the attribution model selection window 540, the attribution segmentation system 128 can generate a new attribution report using an attribution model based on the detected selections.

Thus, the attribution segmentation system 128 introduces functionality that conventional attribution-modeling systems previously could not perform. In particular, the attribution segmentation system 128 can allow for dynamic comparisons of events according to customized (or differing) attribution models. In particular, the attribution segmentation system 128 can provide more complex and specific attributions than some of the conventional attribution models available to attribution-modeling systems. Additionally, or alternatively, in some embodiments, the attribution segmentation system 128 generates attribution visualizations within the attribution user interface that previous systems could not generate (e.g., a single report generated on the fly comparing differing attribution models).

Figure 7:
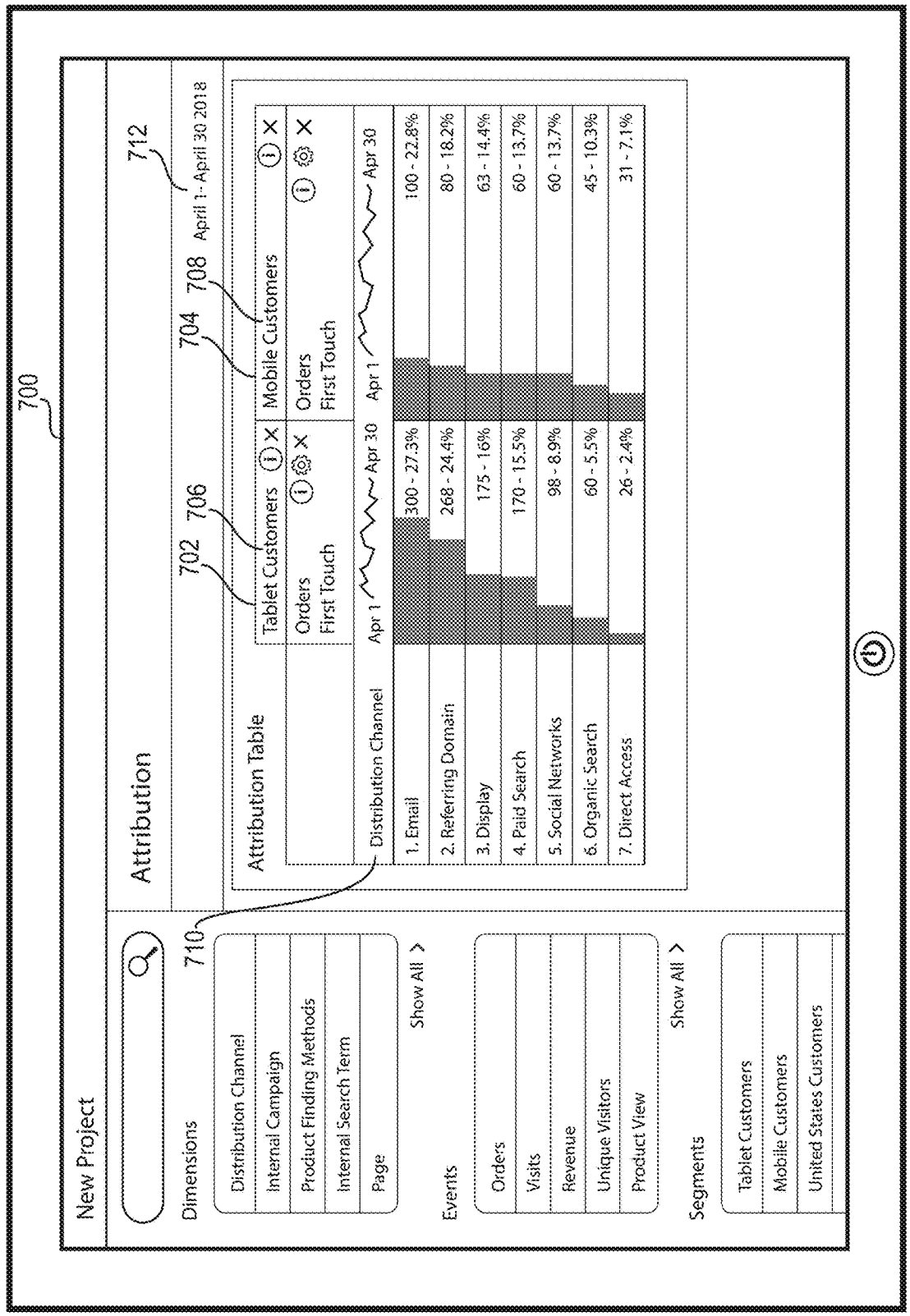
FIG. 7 illustrates multiple digital attribution reports, each for a different user-specified segment reflected in a first digital attribution report in accordance with one or more embodiments.

For example, in one or more embodiments, the attribution segmentation system 128 can generate and display multiple digital attribution reports simultaneously. Further, the attribution segmentation system 128 can generate, for simultaneous display, multiple digital attribution reports for multiple user-specified segments. FIG. 7 illustrates a user interface 700 provided by the attribution segmentation system 128 for simultaneously displaying multiple digital attribution reports for multiple user-specified segments represented in a first digital attribution report. In particular, the user interface 700 includes a second digital attribution report 702 for a first user-specified segment and a third digital attribution report 704 for a second user-specified segment represented in a first digital attribution report. In some embodiments, the user interface 700 can display any number of digital attribution reports for any number of user-specified segments simultaneously.

In one or more embodiments, the user interface 700 enables the administrator to submit a third query for the third digital attribution report 704 after the attribution segmentation system 128 has generated the second digital attribution report 702. For example, in one or more embodiments, the user interface 700 initially displays the second digital attribution report 702 generated by the attribution segmentation system 128 in response to a second query (i.e., a query submitted after generation of a first digital attribution report). The user interface 700 can enable the administrator to select the second digital attribution report 702 and perform a dragging motion to the side (e.g., left or right) to submit a third query. In response, the attribution segmentation system 128 can generate the third digital attribution report 704 and provide it for display on the user interface 700 simultaneously with the second digital attribution report 702.

In one or more embodiments, in response to adding the third digital attribution report 704, the attribution segmentation system 128 merely displays a copy of the second digital attribution report 702 within the user interface 700. Consequently, the attribution segmentation system 128 can modify the user-specified segment indicated by the segment indicator 708 to submit the third query in response to input by the administrator. In some embodiments, the attribution segmentation system 128 simultaneously displays two copies of the first digital attribution report (i.e., before any selection of user-specified segments) and the administrator can select a first and second user-specified segment to submit as part of a second and third query, respectively. In further embodiments, the attribution segmentation system 128 can continuously modify the user-specified segments indicated by the segment indicators 706, 708 in response to input provided by the administrator. As shown in FIG. 7, the user interface 700 can display the segment indicators 706, 708 directly within their respective digital attribution report to clearly indicate the segment represented within the report.

As shown in FIG. 7, the second digital attribution report 702 and the third digital attribution report 704 each show the credit assigned to the same user-specified dimension (indicated by the dimension indicator 710). Indeed, by simultaneously displaying attribution results for different user-specified segments but corresponding to the same user-specified dimension, the attribution segmentation system 128 enables the administrator to compare how the user-specified dimension influences different segments. For example, the user interface 700 shows that the email channel performed better with tablet customers than it did with mobile customers. By contrast, the user interface shows that the social networks channel performed worse with the tablet customers than it did with the mobile customers. Through this comparison an administrator can, for example, determine how to allocate future efforts to improve the effectiveness of a campaign. In one or more embodiments, the user interface 700 enables the administrator to define one user-specified dimension for the second digital attribution report 702 and another user-specified dimension for the third digital attribution report 704.

Similarly, as shown in FIG. 7, the second digital attribution report 702 and the third digital attribution report 704 each show the attribution results relevant to the same time window (i.e., the time window 712). In one or more embodiments, however, the attribution segmentation system 128 defines one time window for the second digital attribution report 702 and another time window for the third digital attribution report 704 in response to input by the administrator.

Figure 8:
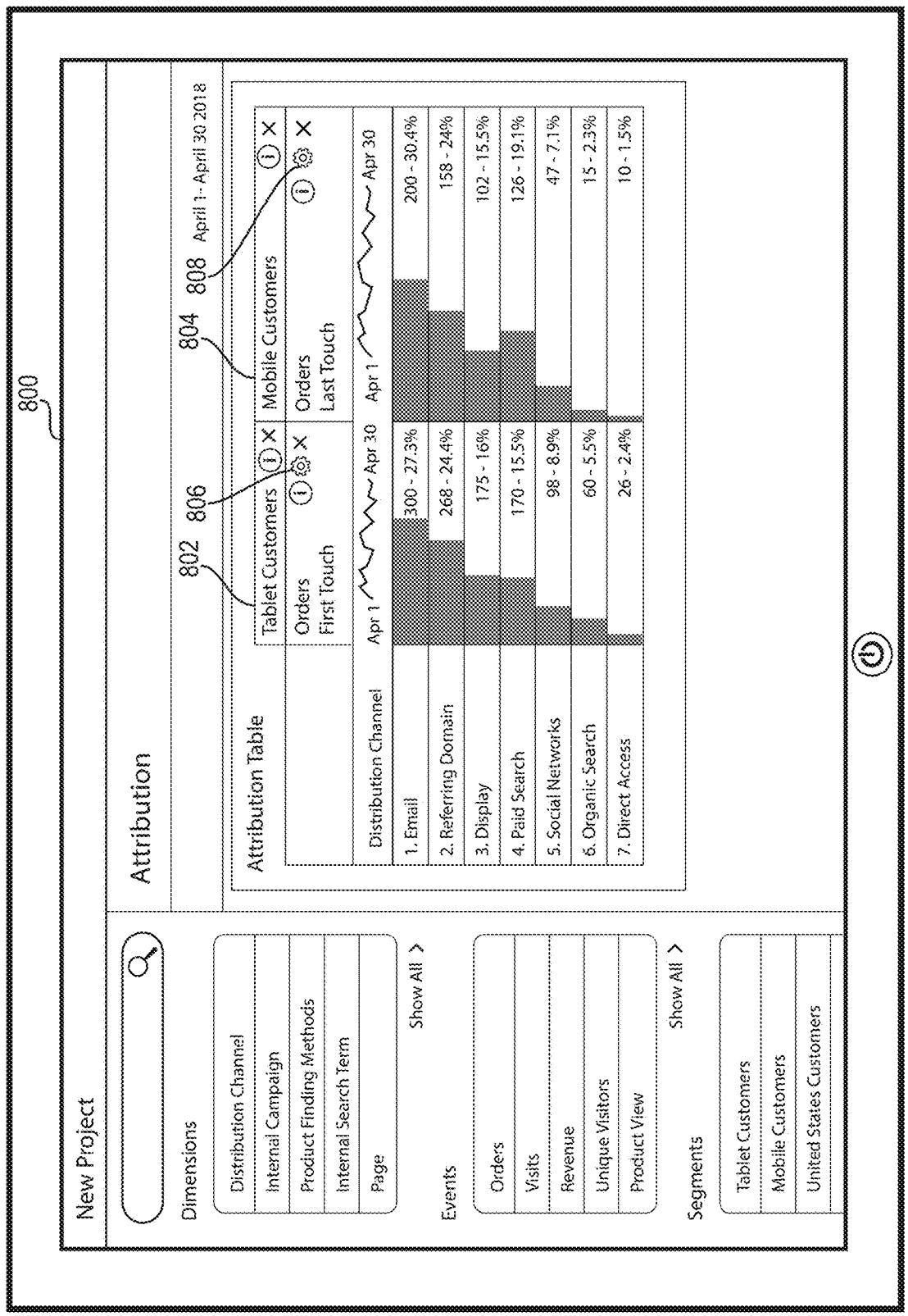
FIG. 8 illustrates multiple digital attribution reports, each based on a different user-specified attribution model in accordance with one or more embodiments.

In one or more embodiments, the attribution segmentation system 128 can generate multiple digital attribution reports for simultaneous display where each report displays attribution results from the application of a different user-specified attribution model. FIG. 8 illustrates a user interface 800 provided by the attribution segmentation system 128 for simultaneous display of multiple digital attribution reports showing attribution results from different user-specified attribution models. In particular, the user interface 800 includes a second digital attribution report 802 and a third digital attribution report 804.

As shown in FIG. 8, the attribution segmentation system 128 provides the settings option 806 within the second digital attribution report 802 and the settings option 808 within the third digital attribution report 804. In response to an administrator selection of either settings option 806, 808, the attribution segmentation system 128 can display a settings window for the corresponding digital attribution report as discussed above with reference to FIG. 5. The displayed settings window enables the administrator to modify the attribution model applied to the touchpoint data reflected in the corresponding digital attribution report as discussed above with reference to FIGS. 6A-6C. By simultaneously displaying digital attribution reports providing the attribution results of different attribution models, the attribution segmentation system 128 enables the administrator to compare the performance of a user-specified dimension and its associated dimension values under different attribution models.

In one or more embodiments, neither the second digital attribution report 802 nor the third digital attribution report 804 display attribution results associated with a user-specified segment (i.e., the attribution results are unfiltered). In some embodiments, the second digital attribution report 802 and the third digital attribution report 804 display attribution results associated with the same user-specified segment. In other words, in some embodiments, the attribution segmentation system 128 generates multiple digital attribution reports having any configuration of segments, attribution models, events, and dimensions.

Figure 9:
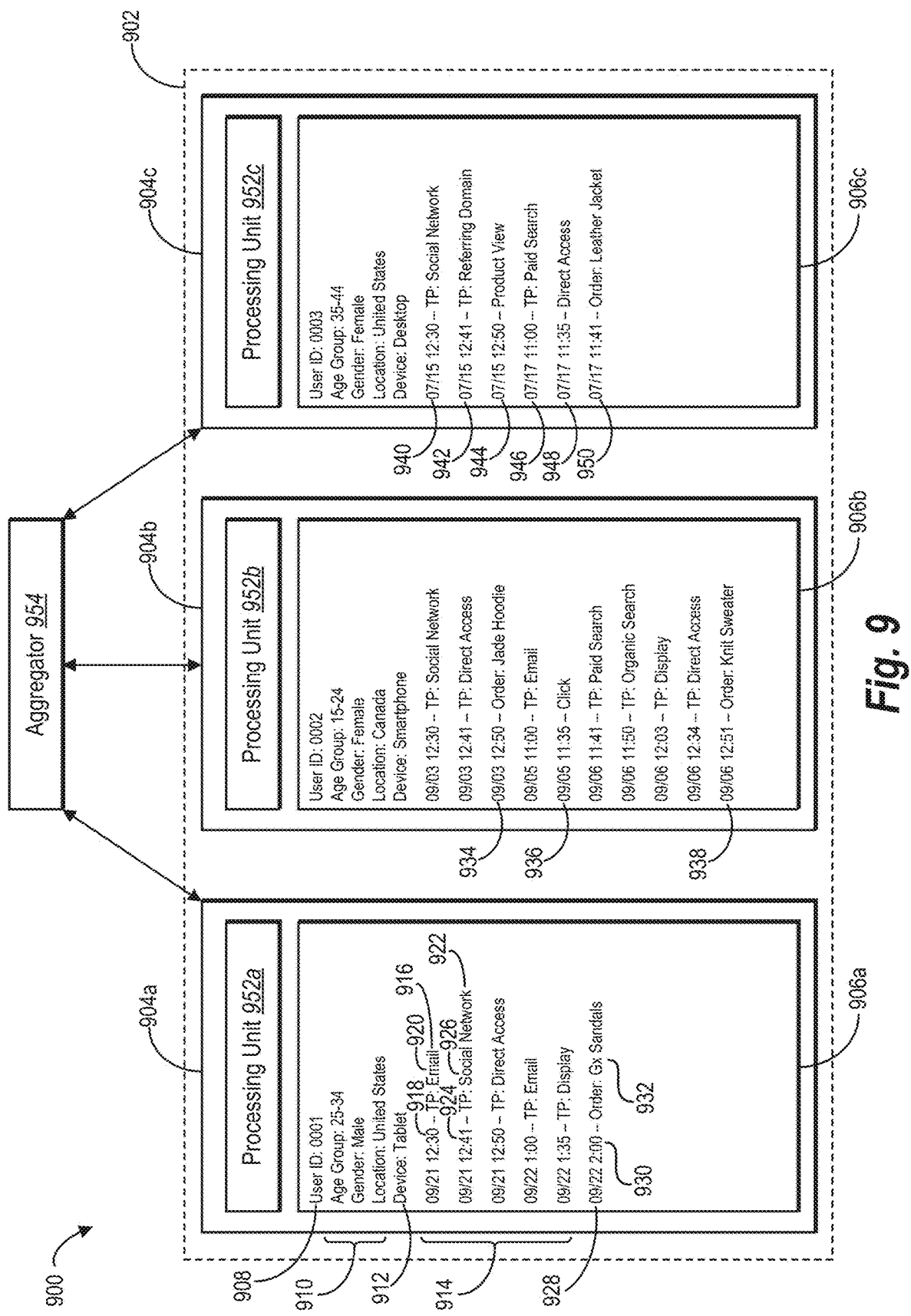
FIGS. 9-10 illustrate schematic representations of architectures of an attribution database in accordance with one or more embodiments.

As mentioned above, the attribution segmentation system 128 stores touchpoint data in an attribution database in a manner to allow for fast and efficient query-time attribution modeling. In response to an administrator submitting a query, the attribution segmentation system 128 retrieves subsets of touchpoint data relevant to the query from the attribution database to generate a digital attribution report. The architecture of one or more embodiments of the attribution database and their use in storing and retrieving touchpoint data for the generation of digital attribution reports will now be discussed with reference to FIGS. 9-10 below. FIG. 9 illustrates an attribution database 900 used by the attribution segmentation system 128 to store and retrieve touchpoint data in accordance with one or more embodiments. As can be seen in FIG. 9, the attribution database 900 includes a plurality of nodes 902 and an aggregator 954.

In particular, the plurality of nodes 902 includes a first node 904*a*, a second node 904*b*, and a third node 904*c*. For simplicity, FIG. 9 illustrates the plurality of nodes 902 including three nodes; however, it should be noted that the plurality of nodes 902 can include any number of nodes. As shown in FIG. 9, each of the nodes 904*a*-904*c* corresponds to a different user. Specifically, each of the nodes 904*a*-904*c* stores touchpoint data associated with a corresponding user within a data storage unit (e.g., one of the data storage units 906*a*-906*c*). For example, the data storage unit of a node can store identification data, user data, device data, touchpoint data, and event data associated with the user corresponding to the node.

To provide an example, the first node 904*a* includes the data storage unit 906*a* for storing data associated with a first user. As shown in FIG. 9, the data storage unit 906*a* includes user ID 908, user data 910, device data 912, touchpoint data 914, and event data 928. The user ID 908 includes an identifier that identifies the first user. For example, FIG. 9 shows the user ID 908 including a numeric identifier assigned to the first user. However, the user ID 908 can include any other identifier appropriate for identifying a user, such as a name of the user or an IP address or cookie associated with the user's device.

The user data 910 includes data characterizing the first user. As shown in FIG. 9, the user data 910 includes data characterizing an age group, a gender, and a location of the first user. It should be noted, however, that the user data 910 can include any data appropriate or useful for characterizing the first user. For example, in one or more embodiments, the user data 910 can include data characterizing the occupation, employer, or level of education of the first user.

The device data 912 includes data characterizing the device used by the first user. As shown in FIG. 9, the device data 912 characterizes the device of the first user as a tablet. The device data 912 can include additional characterizing data as well, such as the brand of the device, the model of the device, or the specs of the device.

The touchpoint data 914 includes instances of touchpoint data associated with the first user. As shown in FIG. 9, a first instance of touchpoint data 916 includes a first timestamp 918 and an associated first indication of a touchpoint 920. In particular, the first instance of touchpoint data 916 shows that the first user received an email at the time and date indicated by the first timestamp 918. Similarly, a second instance of touchpoint data 922 includes a second timestamp 924 and an associated second indication of a touchpoint 926, showing that the first user accessed a social network page at the time and date indicated by the second timestamp 924. In one or more embodiments, the instances of touchpoint data additionally can include the sub-channel element corresponding to the touchpoint. For example, the first instance of touchpoint data 916 can include an email identification number that identifies the particular email received by the first user.

In one or more embodiments, the first node 904a stores each instance of touchpoint data included within the touchpoint data 914 chronologically based on the timestamps of each instance. For example, by comparing the first timestamp 918 with the second timestamp 924, the first node 904a can determine that the first user received an email before accessing a social network page. Consequently, the first node 904a stores the first instance of touchpoint data 916 in a manner that indicates that it chronologically precedes the second instance of touchpoint data 922. By storing the touchpoint data 914 chronologically, the attribution segmentation system 128 can quickly determine, at query time, which data is relevant to a submitted query as will be discussed in more detail below.

As mentioned above, the first node 904a additionally stores the event data 928 within the data storage unit 906a. In particular, the event data 928 stored in the first node 904a includes one instance of event data that includes an event timestamp 930 and an indication of an event 932. The event timestamp 930 indicates when an event occurred, and the indication of the event 932 provides detail regarding the event itself. For example, as shown in FIG. 9, the event data 928 indicates that the first user placed an order for a product labeled "GX Sandals" at the time and date indicated by the event timestamp 930. In one or more embodiments, the indication of the event 932 provides additional detail regarding the event (e.g., the dollar amount of the order). Though the event data 928 provides information regarding an order placed by the first user, in one or more embodiments, the first node 904a stores information regarding other events performed by the first user or resulting from actions of the first user (e.g., an application download, a click, a first-time visit, a product view, etc.).

In one or more embodiments, the first node 904a stores the event data 928 along with the touchpoint data 914 chronologically based on the event timestamp 930. For example, the event timestamp 930 indicates that the first user placed the order for the "GX Sandals" after every touchpoint represented within the touchpoint data 914. Consequently, the first node 904a stores the event data 928 in a manner that indicates that it follows every instance of the touchpoint data 914. By storing the event data 928 with the touchpoint data 914 chronologically, the first node 904a can quickly determine, at query time, how each instance of the touchpoint data 914 relates to the event as will be discussed in more detail below.

In one or more embodiments, each of the nodes 904a-904c can store multiple instances of events, whether those events are the same types of events or different types of events. In other words, each of the nodes 904a-904c stores all touchpoint data and event data associated with the user corresponding to the particular node. To provide an illustration, the second node 904b stores event data that includes multiple instances of event data within the data storage unit 906b. In particular, the second node 904b stores a first instance of event data 934, a second instance of event data 936, and a third instance of event data 938 where each of the instances of event data 934, 936, and 938 include the same information as the event data 928 stored by the first node 904a. For example, as shown in FIG. 9, the first instance of event data 934 and the third instance of event data 938 each represent a different order placed by the second user. As mentioned, each of the nodes 904a-904c can store any type of event data as illustrated by the second instance of event data 936, which represents a click performed by the user. Thus, each of the nodes 904a-904c can store all data associated with a user within its respective data storage unit.

Further, as shown in FIG. 9, each of the nodes 904a-904c further includes a processing unit (e.g., one of the processing units 952a-952c). In one or more embodiments, the processing unit of a node is used to store data in and retrieve data from that node. To provide an example, the third node 904c includes the processing unit 952c. The third node 904c can use the processing unit 952c to store data associated with the third user. For example, as the third node 904c receives touchpoint data and event data associated with the third user, the processing unit 952c can store the data in the data storage unit 906c chronologically based on the timestamp associated with each instance of the data. As shown in FIG. 9, the processing unit 952c stores a first instance of touchpoint data 940, a second instance of touchpoint data 942, a first instance of event data 944, a third instance of touchpoint data 946, a fourth instance of touchpoint data 948, and a second instance of event data 950 chronologically based on the associated timestamps.

Further, as mentioned, the third node 904c can use the processing unit 950c to retrieve data relevant to a query from the data storage unit 906c at query time. For example, the attribution segmentation system 128 can submit instructions to the nodes of the attribution database 900 corresponding to a query that includes a user-specified dimension, a user-specified attribution model, and a user-specified event. In response to receiving the instructions, the third node 904c can then use the processing unit 950c to retrieve a subset of touchpoint data corresponding to the user-specified dimension in accordance with the user-specified attribution model. In one or more embodiments, the processing unit 950c further retrieves the subset of touchpoint data based on the user-specified event. In one or more embodiments, the processing unit 950c retrieves the subset of touchpoint data by filtering out instances of touchpoint data that do not correspond to the user-specified dimension. The processing unit 950c then analyzes the remaining instances of touchpoint data in accordance with the user-specified attribution model and can further analyze the remaining instances of touchpoint data based on the user-specified event. Consequently, the processing unit 950c identifies one or more touchpoints called for by the user-specified attribution model.

To provide an illustration, the attribution segmentation system 128 can receive a query that includes distribution channels as the user-specified dimension, "first touch" as the user-specified attribution model, and "orders" as the user-specified event. The third node 904c can receive this request and use the processing unit 950c to retrieve relevant touchpoint data from the data storage unit 906c. In particular, the processing unit 950c filters the touchpoint data stored in the data storage unit 906c to exclude any touchpoint data that does not correspond to a distribution channel. The processing unit 950c then analyzes the remaining touchpoint data (i.e., in this case, all instances of touchpoint data shown) to identify the first touchpoint as called for by the first touch attribution model. In particular, because the query specified "orders" as the event, the processing unit 950c identifies the first touchpoint with respect to any orders indicated by either the first instance of event data 944 or the second instance of event data 950. Because only the second instance of event data 950 represents an order placed by the third user, the processing unit 950c retrieves a subset of touchpoint data that includes the social network touchpoint represented by the first instance of touchpoint data 940.

Further, the attribution segmentation system 128 can receive a query to generate a digital attribution report for a user-specified segment. Consequently, each of the nodes 904a-904c can use their respective processing unit to retrieve touchpoint data associated with the user-specified segment. In particular, each node filters a subset of touchpoints for the associated user that is associated with the user-specified segment and corresponds to the user-specified dimension in accordance with the user-specified attribution model. More specifically, each node filters to exclude instances of touchpoint data that are not associated with the user-specified segment or do not correspond to the user-specified dimension. Subsequently, each node analyzes the remaining instances of touchpoint data in accordance with the user-specified attribution model (i.e., identifies one or more touchpoints called for by the user-specified attribution model).

In one or more embodiments, at least one of the nodes 904a-904c does not store touchpoint data associated with the node and, therefore, does not retrieve any touchpoint data. For example, the attribution segmentation system 128 can receive a query to generate a digital attribution report for a segment of female users. Consequently, the first node 904a does not retrieve any touchpoint data because the first user associated with the first node 904 is characterized as a male. In other words, the attribution segmentation system 128 only generates the digital attribution report based on touchpoint data stored by the second node 904b and the third node 904c.

As previously mentioned, the user-specified segment can include a particular product. Upon receiving a query for a particular product, each of the nodes 904-904c retrieve touchpoint data associated with that product. For example, the attribution segmentation system 128 can receive a query to generate a digital attribution report associated with the "Jade Hoodie" in accordance with a first touch attribution model. In response, neither the first node 904a nor the third node 904c retrieve any touchpoint data because neither node stores touchpoint data associated with the specified product. Though the second node 904b does store touchpoint data associated with the specified product, it also stores additional, unassociated touchpoint data. Therefore, the second node 904b filters, using the processing unit 952b, to exclude the touchpoint data that is not associated with the specified product and analyzes the remaining touchpoint data in accordance with the first touch attribution model (i.e., identifies one or more touchpoints called for by the user-specified attribution model). Consequently, the second node 904b retrieves a subset of touchpoint data that includes the social network touchpoint as that is the first touchpoint that occurred before the second user ordered the Jade Hoodie. As shown by the example, while the administrator can merely specify a product (e.g., product name or product ID) as the segment, the database 900 retrieves touchpoint data associated with the segment by retrieving touchpoint data associated with users who have interacted with the product (e.g., purchased, viewed, etc.)

In one or more embodiments, the processing units can further combine instances of touchpoint data retrieved from their respective nodes. In particular, the processing units can combine instances of touchpoint data that are of the same type. For example, if the processing unit 952a retrieved a subset of touchpoint data that included both email touchpoints and the display touchpoint in accordance with the user-specified attribution model, the processing unit 952a could combine the two email touchpoints (i.e., combine the credit attributed to each email touchpoint in accordance with the applicable attribution model). Consequently, the aggregator 954 is able to combine subsets of touchpoint data that have already been consolidated by each respective node. In other words, the attribution segmentation system 128 can use the database 900 to perform a two-step process for combining touchpoint data—a first step performed by each node within the plurality of nodes 902 and a second step performed by the aggregator 952 discussed as follows.

As mentioned above, the attribution database 900 further includes the aggregator 954. In one or more embodiments, the attribution segmentation system 128, after receiving a query, uses the aggregator 954 to instruct the plurality of nodes 902 to retrieve subsets of touchpoint data relevant to the query. In some embodiments, the aggregator 954 generates instructions based on the query and passes the instructions to the plurality of nodes 902. In some embodiments, the aggregator 954 merely forwards the query onto the plurality of nodes 902.

Additionally, as mentioned, the attribution segmentation system 128 uses the aggregator 954 to combine the subsets of touchpoint data retrieved from the plurality of nodes 902. In particular, the aggregator 954 combines touchpoints from the subsets of touchpoint data that correspond to the same dimension value. For example, in response to a query, the aggregator 954 can receive three subsets of touchpoint data from the plurality of nodes 902, each subset of touchpoint data including a social network touchpoint. Subsequently, the aggregator 954 can combine the subsets of touchpoint data to provide an attribution to the social network distribution channel that includes a combination of the credit assigned at each node in accordance with the applicable attribution model. After the aggregator 954 combines the subsets of touchpoint data received from the plurality of nodes 902, the attribution segmentation system 128 can use the combined subsets of touchpoint data to generate a digital attribution report.

Figure 10:
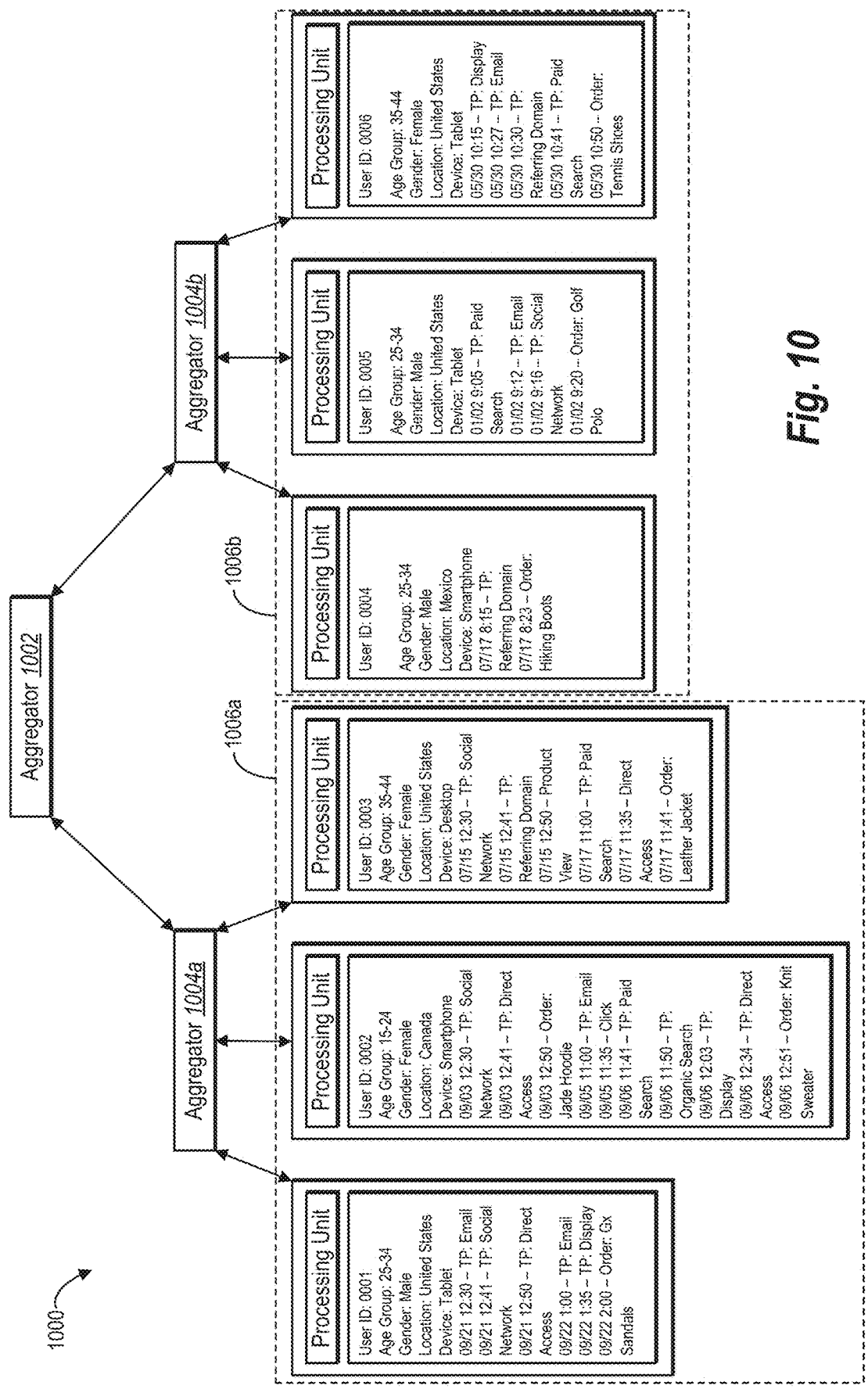

In one or more embodiments, the attribution database further includes a plurality of intermediate aggregators. FIG. 10 illustrates an attribution database 1000 that includes a plurality of intermediate aggregators in accordance with one or more embodiments. In particular, the attribution database 1000 includes a master aggregator 1002, a first intermediate aggregator 1004a, a second intermediate aggregator 1004b, a first subset of nodes 1006a, and a second subset of nodes 1006b. As seen in FIG. 10, the first subset of nodes 1006a corresponds to the first intermediate aggregator 1004a and the second subset of nodes 1006b corresponds to the second intermediate aggregator 1004b. In one or more embodiments, the attribution database 1000 includes any number of intermediate aggregators and corresponding subsets of nodes.

In one or more embodiments, the combination of intermediate aggregator and the corresponding subset of nodes operates similar to attribution database 900 of FIG. 9. For example, the first subset of nodes 1006a uses the user-specified attribution model included in a query to identify first subsets of touchpoint data associated with the user-specified segment and corresponding to the user-specified dimension. The first intermediate aggregator 1004a then combines data from the first subsets of touchpoint data to generate a first set of aggregated touchpoint data. Similarly, the second subset of nodes 1006b uses the user-specified attribution model to identify second subsets of touchpoint data associated with the user-specified segment and corresponding to the user-specified dimension, and the second intermediate aggregator 1004b combines data from the second subsets to generate a second set of aggregated touchpoint data.

The master aggregator 1002 combines data from the intermediate aggregators 1004a, 1004b. For example, as shown in FIG. 10, the master aggregator 1002 can combine the first set of aggregated touchpoint data received from the first intermediate aggregator 1004a and the second set of aggregated touchpoint data received from the second intermediate aggregator 1004b. The attribution segmentation system 128 can then use the combined sets of aggregated touchpoint data to generate a digital attribution report.

As shown above, the structure of the backend (e.g., attribution database 900) of the attribution segmentation system 128 allows for on demand, query-time attribution modeling in a fast and efficient manner. The structure of the backend (e.g., attribution database 900) of the attribution segmentation system 128 allows for fast and efficient query-time attribution modeling. In particular, by storing touchpoint data for a single user in each node, the attribution segmentation system 128 eliminates the need for node cross-talk and ensures that each node can essentially instantaneously (e.g., in milliseconds) retrieve and forward to an aggregator the data applicable to an attribution query. The aggregator can then combine the applicable data so as to build an attribution report. Thus, despite having to processes large numbers of data, the structure of the attribution segmentation system 128 allows for fast and flexible query-time attribution modeling.

Thus, the attribution segmentation system 128 stores touchpoint data in an attribution database. Additionally, the attribution segmentation system 128 can use the touchpoint data, as stored in the attribution database, to generate digital attribution reports in real time in response to receiving a query. In particular, the attribution segmentation system 128 can use the touchpoint data, as stored in the attribution database to generate digital attribution reports for segments of touchpoint data. The algorithms and acts described in reference to FIGS. 9-10 can comprise the corresponding structure for performing a step for storing touchpoint data in an attribution database in a manner that supports query-time segmentation for attribution modeling. Additionally, the attribution database architecture described in relation to FIGS. 9-10 can comprise the corresponding structure for performing a step for storing touchpoint data in an attribution database in a manner that supports query-time segmentation for attribution modeling.

Further, the attribution segmentation system 128 retrieves and combines touchpoint data in response to receiving a query. Additionally, the attribution segmentation system 128 can use the combined data to generate a digital attribution report in response to a query and can further generate digital attribution reports for segments of touchpoint data. Thus, the algorithms and acts described with reference to FIGS. 3-10 can comprise the corresponding structure for performing, in real time in response to a second query, a step for generating a second digital attribution report for a user-specified segment represented in the first digital attribution report based on the touchpoint data stored in the attribution database. Additionally, the attribution database architecture described in relation to FIGS. 3-10 can comprise the corresponding structure for performing, in real time in response to a second query, a step for generating a second digital attribution report for a user-specified segment represented in the first digital attribution report based on the touchpoint data stored in the attribution database.

Figure 11:
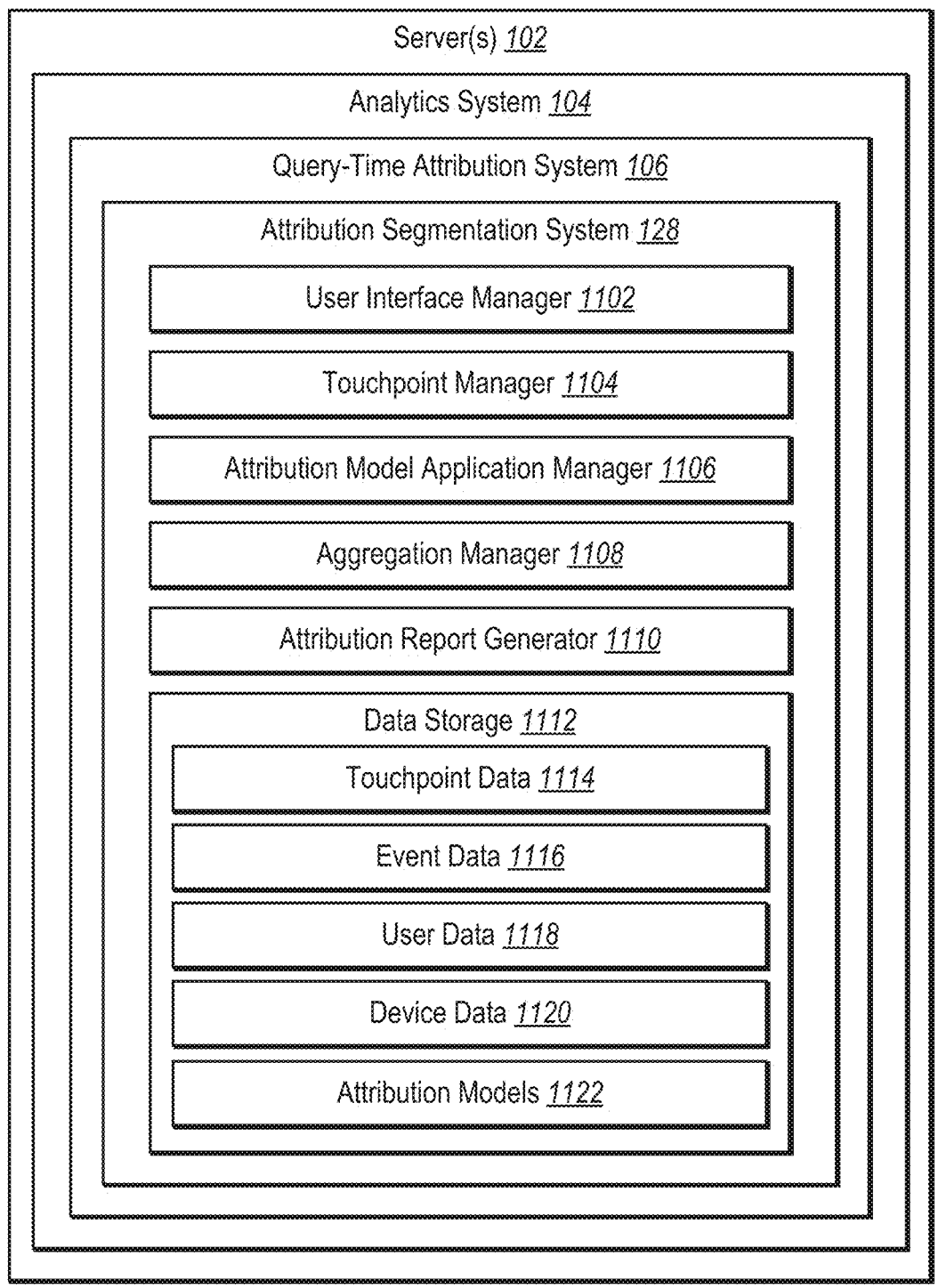
FIG. 11 illustrates an example schematic diagram of an attribution segmentation system in accordance with one or more embodiments.

FIG. 11 illustrates a detailed schematic diagram of an example architecture of the attribution segmentation system 128. As shown, the attribution segmentation system 128 can be part of the server(s) 102, the analytics system 104, and the query-time attribution system 106. Additionally, the attribution segmentation system 128 can include, but is not limited to, a user interface manager 1102, a touchpoint manager 1104, an attribution model application manager 1106, an aggregation manager 1108, an attribution report generator 1110, and data storage 1112 (which includes touchpoint data 1114, event data 1116, user data 1118, device data 1120, and attribution models 1122).

As just mentioned, and as illustrated in FIG. 11, the attribution segmentation system 128 includes the user interface manager 1102. In particular, the user interface manager 1102 provides, to a client device associated with an administrator, a user interface through which the administrator can submit a query for a digital attribution report. For example, the user interface manager 1102 can provide options for selecting a dimension, an event, an attribution model, and or a segment. Additionally, the user interface manager 1102 provides, through the user interface, one or more digital attribution reports generated by the attribution report generator 1110 in response to the query.

As shown in FIG. 11, the attribution segmentation system 128 also includes the touchpoint manager 1104. In particular, the touchpoint manager 1104 can track touchpoints associated with a given user and store the corresponding touchpoint data in touchpoint data 1114. For example, the touchpoint manager 1104 can communicate with a third-party network server (e.g., the third-party network server 122) to determine when a touchpoint has occurred (e.g., when an email has been received or when a search has been performed).

Additionally, as shown in FIG. 11, the attribution segmentation system 128 includes the attribution model application manager 1106. In particular, each node of the attribution database includes an instance of the attribution model application manager 1106 (e.g., stored in the processing unit). The attribution model application manager 1106 retrieves data relevant to a query received through the user interface manager 1102. For example, the attribution model application manager 1106 of a given node can retrieve a subset of touchpoint data associated with the user-specified segment and corresponding to the user-specified dimension in accordance with the user-specified attribution model and based on a user-specified event. The attribution model application manager 1106 further combines multiple instances of touchpoint data, when applicable.

Further, as shown in FIG. 11, the attribution segmentation system 128 includes the aggregation manager 1108. In particular, the aggregator (or each intermediate aggregator) of the attribution database includes an instance of the aggregation manager 1108. The aggregation manager 1108 combines subsets of touchpoint data received from the instances of the attribution model application manager 1106 (or combines sets of aggregated touchpoint data received from instances of the aggregation manager 1108 corresponding to intermediate aggregators).

Additionally, as shown in FIG. 11, the attribution segmentation system 128 includes the attribution report generator 1110. In particular, the attribution report generator 1110 generates digital attribution reports using subsets of touchpoint data combined by the aggregation manager 1108. The attribution report generator 1110 can then send the digital attribution reports to the user interface manager 1102 for display through a user interface.

Further, as shown in FIG. 11, the attribution segmentation system 128 includes data storage 1112. In particular, data storage 1112 includes touchpoint data 1114, event data 1116, user data 1118, device data 1120, and attribution models

1122. Each node of the attribution database includes an instance of touchpoint data 1114, event data 1116, user data 1118, and device data 1120. Touchpoint data 1114 stores instances of touchpoint data associated with a particular user. An instance of the attribution model application manager 1106 retrieves instances of touchpoint data from a corresponding instance of touchpoint data 1114. Event data 1116 stores instances of event data (e.g., including any products associated with a particular event). User data 1118 stores data describing a user (e.g., age, gender, location, etc.) including the user ID. Device data 1120 stores data regarding a device used by the user (e.g., device type, model, specs, etc.). Attribution models 1122 stores the attribution models the attribution segmentation system 128 can apply. For example, attribution models 1122 can store instructions, that get passed to the attribution model application manager 1106, on how to apply the particular attribution model after an administrator has submitted a query.

Each of the components 1102-1122 of the attribution segmentation system 128 can include software, hardware, or both. For example, the components 1102-1122 can include one or more instructions stored on a computer-readable storage medium and executable by processors of one or more computing devices, such as a client device or server device. When executed by the one or more processors, the computer-executable instructions of the attribution segmentation system 128 can cause the computing device(s) to perform the methods described herein. Alternatively, the components 1102-1122 can include hardware, such as a special-purpose processing device to perform a certain function or group of functions. Additionally, or alternatively, the components 1102-1122 of the attribution segmentation system 128 can include a combination of computer-executable instructions and hardware.

Furthermore, the components 1102-1122 of the attribution segmentation system may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1122 of the attribution segmentation system 128 may be implemented as a stand-alone application, such as a desktop or mobile application. Furthermore, the components 1102-1122 of the attribution segmentation system 128 may be implemented as one or more web-based applications hosted on a remote server. Alternatively, or additionally, the components 1102-1122 of the attribution segmentation system 128 may be implemented in a suite of mobile device applications or "apps." For example, in one or more embodiments, the attribution segmentation system can comprise or operate in connection with digital software applications such as ADOBE® ANALYTICS CLOUD® or ADOBE® MARKETING CLOUD®. "ADOBE," "ANALYTICS CLOUD," and "MARKETING CLOUD" are either registered trademarks or trademarks of Adobe Systems Inc. in the United States and/or other countries.

Figure 12:
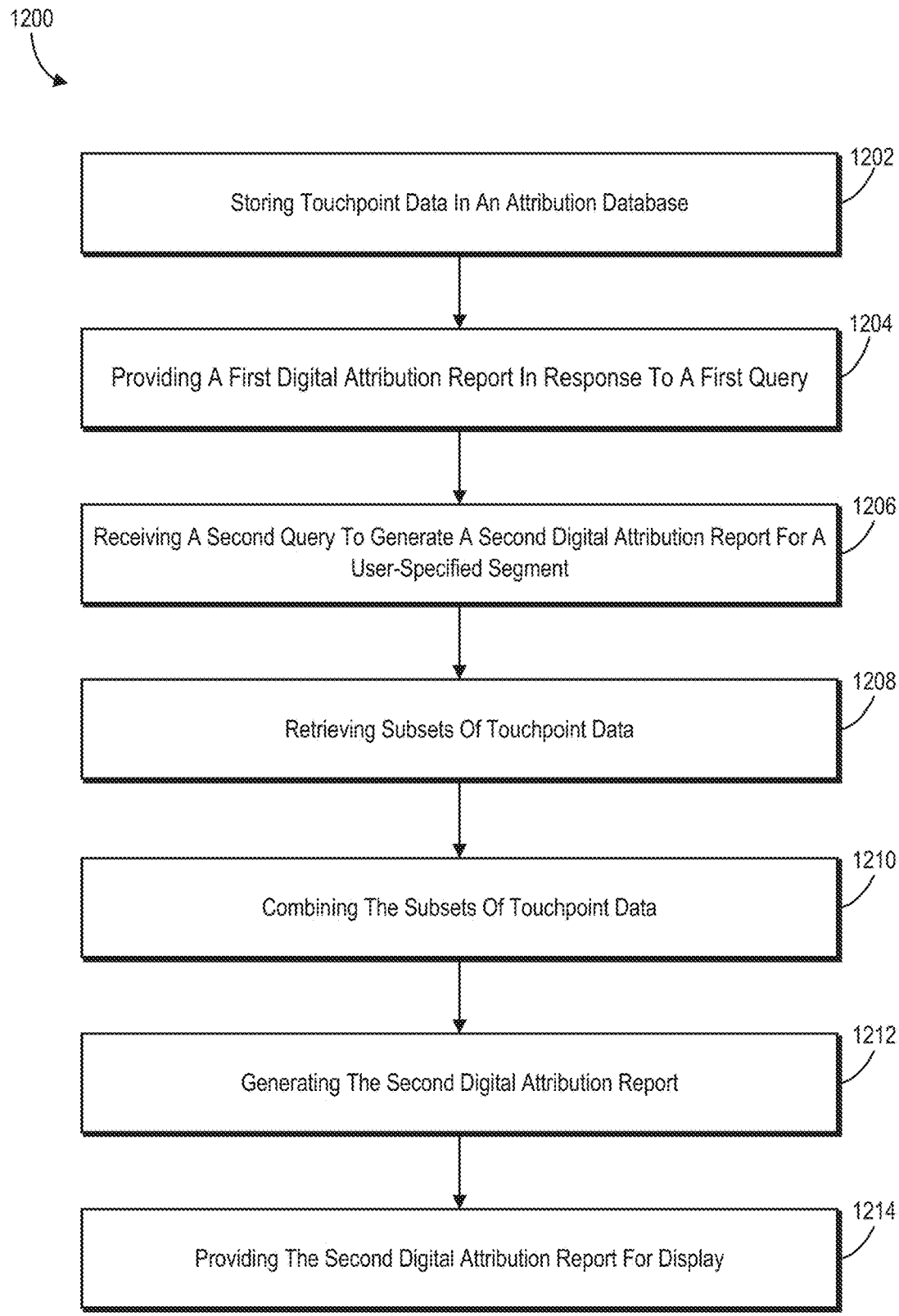
FIG. 12 illustrates a flowchart of a series of acts for generating a second digital attribution report for a segment reflected in a first digital attribution report in accordance with one or more embodiments.

FIGS. 1-11, the corresponding text, and the examples provide a number of different methods, systems, devices, and non-transitory computer readable media of the attribution segmentation system 128. In addition to the foregoing, one or more embodiments can also be described in terms of flowcharts comprising acts for accomplishing a particular result, as shown in FIG. 12. FIG. 12 may be performed with more or fewer acts. Further, the acts may be performed in differing orders. Additionally, the acts described herein may be repeated or performed in parallel with one another or parallel with different instances of the same or similar acts.

As mentioned, FIG. 12, illustrates a series of acts 1200 for generating a second digital attribution report for a segment reflected in a first digital attribution report. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions that, when executed by one or more processors, cause a computing device to perform the acts of FIG. 12. In some embodiments, a system can perform the acts of FIG. 12.

The series of acts 1200 includes an act 1202 of storing touchpoint data in an attribution database. For example, the act 1202 involves storing touchpoint data in an attribution database comprising an aggregator and a plurality of nodes, wherein each node corresponds to a given user and stores touchpoint data associated with the given user. In one or more embodiments, the touchpoint data comprises one or more touchpoints and a timestamp associated with each of the one or more touchpoints. Specifically, in some embodiments, an instance of touchpoint data comprises an indication of a touchpoint and a timestamp associated with the touchpoint. Consequently, in some embodiments, storing the touchpoint data in the attribution database comprises storing, in each node, instances of touchpoint data sequentially based on the timestamp associated with each touchpoint of a corresponding user.

In one or more embodiments, the attribution database further comprises a plurality of intermediate aggregators, wherein each intermediate aggregator is associated with, and aggregates data from, a subset of the nodes of the plurality of nodes. For example, the attribution database can comprise a first intermediate aggregator corresponding to a first subset of nodes and a second intermediate aggregator corresponding to a second subset of nodes.

The series of acts 1200 also includes an act 1204 of providing a first digital attribution report in response to a first query. For example, the act 1204 involves providing, in real time in response to a first query, a first digital attribution report for a user-specified dimension based on a user-specified attribution model. In particular, in one or more embodiments, the attribution segmentation system 128 receives a first query to generate a first digital attribution report, retrieves touchpoint data relevant to the query from the attribution database, and generates the first digital attribution report based on the retrieved touchpoint data.

The series of acts 1200 further includes an act 1206 of receiving a second query to generate a second digital attribution report for a user-specified segment. For example, the act 1206 involves receiving a second query to generate a second digital attribution report for a user-specified segment represented in the first digital attribution report. In one or more embodiments, the user-specified segment comprises at least one of a product segment, a user segment, or a device segment.

Additionally, the series of acts 1200 includes an act 1208 of retrieving subsets of touchpoint data. For example, the act 1208 involves, in response to receiving the second query and in real time, retrieving, using the nodes of the plurality of nodes, subsets of touchpoint data associated with the user-specified segment and corresponding to the user-specified dimension in accordance with the user-specified attribution model. In one or more embodiments, retrieving the subsets of touchpoint data comprises filtering, at each node, a subset of touchpoints for a corresponding user that is associated with the user-specified segment and corresponds to the user-specified dimension in accordance with the user-specified attribution model.

In some embodiments, retrieving the subsets of touchpoint data comprises sending, to the plurality of nodes, a request for touchpoint data associated with the user-specified segment and corresponding to the user-specified dimension based on the user-specified attribution model; and using the user-specified attribution model, at the plurality of nodes, to identify subsets of touchpoint data associated with the user-specified segment and corresponding to the user-specified dimension to send to the aggregator. In one or more embodiments, using the user-specified attribution model, at the plurality of nodes, to identify subsets of touchpoint data comprises filtering, at each node, a subset of touchpoints for the corresponding user that is associated with the user-specified segment and corresponds to the user-specified dimension in accordance with the user-specified attribution model. In some embodiments, filtering, at each node, the subset of touchpoints comprises filtering, at each node, to exclude instances of touchpoint data that are not associated with the user-specified segment or do not correspond to the user-specified dimension; and analyzing instances of touchpoint data remaining after the filtering in accordance with the user-specified attribution model. In further embodiments, analyzing the instances of touchpoint data remaining after the filtering comprises identifying one or more touchpoints called for by the user-specified attribution model.

In one or more embodiments, the user-specified attribution model comprises one or more user-specified parameters. For example, the user-specified attribution model can include a custom attribution model comprising a user-specified set of weights to be applied to the subsets of touchpoint data associated with the user-specified segment and corresponding to the user-specified dimension. Alternatively, the user-specified attribution model can include a time decay attribution model comprising a user-specified half-life to be applied to the subsets of touchpoint data associated with to the user-specified segment and corresponding to the user-specified dimension.

Where the attribution database further comprises a plurality of intermediate aggregators, using the user-specified attribution model, at the plurality of nodes, to identify subsets of touchpoint data comprises using the user-specified attribution model, at the first subset of nodes, to identify a first subsets of touchpoint data associated with the user-specified segment and corresponding to the user-specified dimension; and using the user-specified attribution model, at the second subset of nodes, to identify a second subsets of touchpoint data associated with the user-specified segment and corresponding to the user-specified dimension.

Further, the series of acts 1200 includes an act 1210 of combining the subsets of touchpoint data. For example, the act 1210 involves, in response to receiving the second query and in real time, combining, using the aggregator, the subsets of touchpoint data associated with the user-specified segment and corresponding to the user-specified dimension in accordance with the user-specified attribution model.

Where the attribution database further comprises a plurality of intermediate aggregators, the series of acts 1200 can further include an act for aggregating, using each intermediate aggregator, the subsets of touchpoint data from the subset of nodes corresponding to each intermediate aggregator to generate sets of aggregated touchpoint data (not shown). Consequently, combining, using the aggregator, the subsets of touchpoint data comprises combining the sets of aggregated touchpoint data from the plurality of intermediate aggregators. To illustrate, where the attribution database further comprises a first and second intermediate aggregator, the series of acts 1200 further includes aggregating, using the first intermediate aggregator, data from the first subsets of touchpoint data associated with the user-specified segment and corresponding to the user-specified dimension to generate a first set of aggregated touchpoint data; and aggregating, using the second intermediate aggregator, data from the second subsets of touchpoint data associated with the user-specified segment and corresponding to the user-specified dimension to generate a second set of aggregated touchpoint data. Consequently, combining, at the aggregator, the subsets of touchpoint data associated with the user-specified segment and corresponding to the user-specified dimension from the plurality of nodes comprises combining the first set of aggregated touchpoint data and the second set of aggregated touchpoint data.

The series of acts 1200 also includes an act 1212 of generating the second digital attribution report. For example, the act 1212 involves, in response to receiving the second query and in real time, generating the second digital attribution report using the combined subsets of touchpoint data (or the combined sets of aggregated touchpoint data).

The series of acts 1200 further includes an act 1214 of providing the second digital attribution report for display. For example, the act 1214 involves, in response to receiving the second query and in real time, providing the second digital attribution report for display (i.e., display on a user interface of an administrator device).

In one or more embodiments, the series of acts 1200 further includes acts for generating a third digital attribution report in response to receiving a third query. For example, in one or more embodiments, the attribution segmentation system 128 receives a third query to generate a third digital attribution report for a second user-specified segment represented in the first digital attribution report. In response to receiving the query, and in real time, the attribution segmentation system can retrieve, using the nodes of the plurality of nodes, second subsets of touchpoint data associated with the second user-specified segment and corresponding to the user-specified dimension in accordance with the user-specified attribution model; combine, using the aggregator, the second subsets of touchpoint data associated with the second user-specified segment and corresponding to the user-specified dimension in accordance with the user-specified attribution model; and generate the third digital attribution report using the combined second subsets of touchpoint data. Subsequently, the attribution segmentation system 128 can provide the third digital attribution report for display simultaneously with the second digital attribution report.

In one or more embodiments, the third query comprises a second user-specified attribution model. Consequently, the attribution segmentation system retrieves, using the nodes of the plurality of nodes, the second subsets of touchpoint data associated with the second user-specified segment and corresponding to the user-specified dimension in accordance with the second user-specified attribution model and combines, using the aggregator, the second subsets of touchpoint data associated with the second user-specified segment and corresponding to the user-specified dimension in accordance with the second user-specified attribution model. In other words, the attribution segmentation system 128 can generate multiple digital attribution reports having any configuration of user-specified segments, user-specified attribution models, user-specified events, and user-specified dimensions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
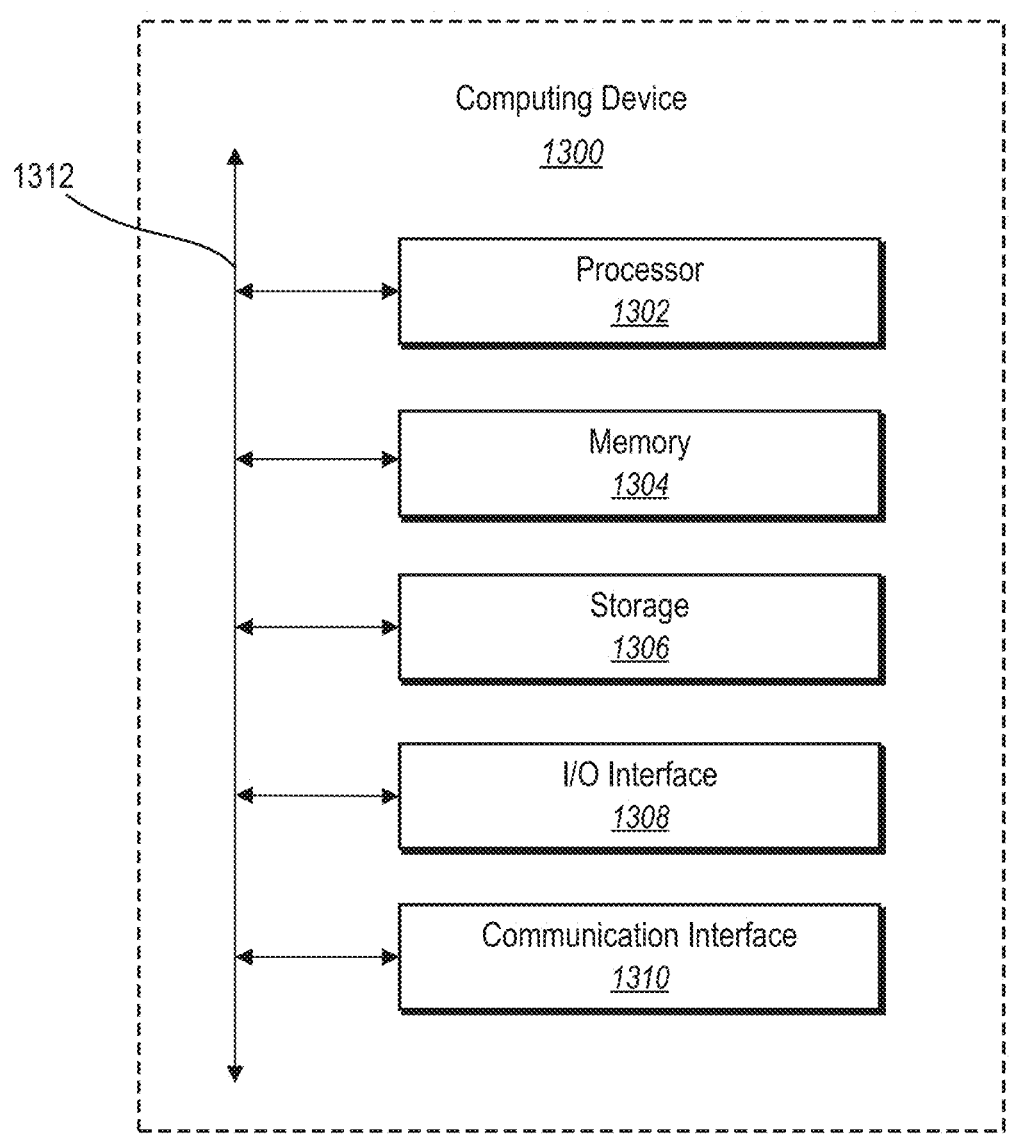
FIG. 13 illustrates a block diagram of an exemplary computing device in accordance with one or more embodiments.

FIG. 13 illustrates a block diagram of an example computing device 1300 that may be configured to perform one or more of the processes described above. One will appreciate that one or more computing devices, such as the computing device 1300 may represent the computing devices described above (e.g., the server(s) 102, the client devices 110a-110n, and the administrator device 116). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306, which includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for collecting and analyzing analytics data about network communications, a method for generating digital attribution reports in real time comprising:
storing touchpoint data in an attribution database comprising an aggregator and a plurality of nodes, wherein each node corresponds to a single user that differs from other users corresponding to other nodes and comprises a data storage unit that stores a user ID associated with the single user and a processing unit that receives and stores touchpoint data associated with the single user within the data storage unit;
providing, in real time in response to a first query, a first digital attribution report for a user-specified dimension using a set of touchpoint data retrieved from nodes of the plurality of nodes of the attribution database by processing units of the nodes based on a user-specified attribution model;
receiving a second query to generate a second digital attribution report for a user-specified segment represented in the first digital attribution report; and
in response to receiving the second query:
retrieving, from the attribution database using the processing units of the nodes, instances of touchpoint data associated with the user-specified segment from the second query and corresponding to the user-specified dimension from the first query in accordance with the user-specified attribution model from the first query; and
generating the second digital attribution report showing an attribution attributable to the user-specified segment represented in the first digital attribution report using the instances of touchpoint data.

2. The method of claim 1, wherein the touchpoint data comprises one or more touchpoints and a timestamp associated with each of the one or more touchpoints.

3. The method of claim 1, wherein the user-specified segment comprises at least one of a product segment, a user segment, or a device segment.

4. The method of claim 1, wherein the user-specified attribution model comprises one or more user-specified parameters.

5. A non-transitory computer readable storage medium comprising instructions that, when executed by at least one processor, cause a computing device to:
store data in an attribution database comprising an aggregator and a plurality of nodes, wherein each node corresponds to a single user that differs from other users corresponding to other nodes and comprises a data storage unit that stores a user ID associated with the single user and a processing unit that receives and stores touchpoint data associated with the single user within the data storage unit;
generate, in real time in response to a first query, a first digital attribution report for a user-specified dimension using a set of touchpoint data retrieved from nodes of the plurality of nodes of the attribution database by processing units of the nodes based on a user-specified attribution model;
receive a second query to generate a second digital attribution report for a user-specified segment represented in the first digital attribution report; and
in response to receiving the second query:
retrieve, from the attribution database using the processing units of the nodes, instances of touchpoint data associated with the user-specified segment from the second query and corresponding to the user-specified dimension from the first query in accordance with the user-specified attribution model from the first query; and
generate the second digital attribution report showing an attribution attributable to the user-specified segment represented in the first digital attribution report using the instances of touchpoint data.

6. The non-transitory computer readable storage medium of claim 5,
further comprising instructions that, when executed by the at least one processor, cause the computing device to combine, in response to receiving the second query and using the aggregator, the instances of touchpoint data associated with the user-specified segment and corresponding to the user-specified dimension in accordance with the user-specified attribution model,
wherein the instructions, when executed by the at least one processor, cause the computing device to generate the second digital attribution report using the instances of touchpoint data by generating the second digital attribution report using the combined instances of touchpoint data.

7. The non-transitory computer readable storage medium of claim 6, wherein the attribution database further comprises a plurality of intermediate aggregators, wherein each intermediate aggregator is associated with, and aggregates data from, a subset of nodes of the plurality of nodes of the attribution database.

8. The non-transitory computer readable storage medium of claim 7,
further comprising instructions that, when executed by the at least one processor, cause the computing device to aggregate, using each intermediate aggregator, the instances of touchpoint data from the subset of nodes corresponding to each intermediate aggregator to generate sets of aggregated touchpoint data,
wherein the instructions, when executed by the at least one processor, cause the computing device to combine, using the aggregator, the instances of touchpoint data by combining the sets of aggregated touchpoint data from the plurality of intermediate aggregators.

9. The non-transitory computer readable storage medium of claim 5, wherein:
an instance of touchpoint data comprises an indication of a touchpoint and a timestamp associated with the touchpoint, and
the instructions, when executed by the at least one processor, cause the computing device to store the touchpoint data in the attribution database by storing, in each node, instances of touchpoint data sequentially based on the timestamp associated with each touchpoint of a corresponding user.

10. The non-transitory computer readable storage medium of claim 5, wherein the instructions, when executed by the at least one processor, cause the computing device to retrieve, from the attribution database using the processing units of the nodes, the instances of touchpoint data associated with the user-specified segment from the second query and corresponding to the user-specified dimension from the first query in accordance with the user-specified attribution model from the first query by filtering, at each node, a subset of touchpoints for a corresponding user that is associated with the user-specified segment and corresponds to the user-specified dimension in accordance with the user-specified attribution model.

11. The non-transitory computer readable storage medium of claim 5, further comprising instructions that, when executed by the at least one processor, cause the computing device to:
receive a third query to generate a third digital attribution report for a second user-specified segment represented in the first digital attribution report;
in response to receiving the third query and in real time:
retrieve, using the processing units of the nodes, additional instances of touchpoint data associated with the second user-specified segment from the third query and corresponding to the user-specified dimension from the first query in accordance with the user-specified attribution model;
combine, using the aggregator, the additional instances of touchpoint data associated with the second user-specified segment from the third query and corresponding to the user-specified dimension from the first query in accordance with the user-specified attribution model; and
generate the third digital attribution report using the combined additional instances of touchpoint data; and
provide the third digital attribution report for display simultaneously with the second digital attribution report.

12. The non-transitory computer readable storage medium of claim 11, wherein:
the third query comprises a second user-specified attribution model, and
the instructions, when executed by the at least one processor, cause the computing device to:

retrieve the additional instances of touchpoint data associated with the second user-specified segment from the third query and corresponding to the user-specified dimension from the first query in accordance with the user-specified attribution model by retrieving, using the processing units of the nodes, the additional instances of touchpoint data associated with the second user-specified segment from the third query and corresponding to the user-specified dimension from the first query in accordance with the second user-specified attribution model from the third query, and combine the additional instances of touchpoint data associated with the second user-specified segment from the third query and corresponding to the user-specified dimension from the first query in accordance with the user-specified attribution model by combining, using the aggregator, the additional instances of touchpoint data associated with the second user-specified segment from the third query and corresponding to the user-specified dimension from the first query in accordance with the second user-specified attribution model from the third query.

13. The non-transitory computer readable storage medium of claim 12, wherein the user-specified attribution model differs from the second user-specified attribution model.

14. A system comprising:
a memory component comprising:
an aggregator; and
a plurality of nodes, wherein each node corresponds to a single user that differs from other users corresponding to other nodes and comprises a data storage unit that stores a user ID associated with the single user and a processing unit that is configured to receive and sequentially store touchpoint data associated with the single user within the data storage unit;
at least one server; and
at least one non-transitory computer readable storage medium comprising instructions that, when executed by the at least one server, cause the system to:
provide, in real time in response to a first query, a first digital attribution report for a user-specified dimension using a set of touchpoint data retrieved from nodes of the plurality of nodes by processing units of the nodes based on a user-specified attribution model;
receive a second query to generate a second digital attribution report for a user-specified segment represented in the first digital attribution report; and
in response to receiving the second query and in real time:
send, to the plurality of nodes, a request for touchpoint data associated with the user-specified segment from the second query and corresponding to the user-specified dimension from the first query based on the user-specified attribution model from the first query;
use the processing units of the nodes to identify subsets of the set of touchpoint data associated with the user-specified segment from the second query and corresponding to the user-specified dimension from the first query to send to the aggregator based on the user-specified attribution model from the first query;
combine, at the aggregator, the subsets of the set of touchpoint data associated with the user-specified segment and corresponding to the user-specified dimension retrieved from the plurality of nodes;
generate the second digital attribution report based on the combined subsets; and
provide the second digital attribution report for display on a client device.

15. The system of claim 14,
wherein an instance of touchpoint data comprises an indication of a touchpoint and a timestamp associated with the touchpoint, and
further comprising instructions that, when executed by the at least one server, cause the system to store, in each node, instances of touchpoint data sequentially based on the timestamp associated with each touchpoint of a corresponding user.

16. The system of claim 14, wherein the instructions, when executed by the at least one server, cause the system to use the processing units of the nodes to identify the subsets of the set of touchpoint data associated with the user-specified segment from the second query and corresponding to the user-specified dimension from the first query to send to the aggregator based on the user-specified attribution model from the first query by filtering, at each node, a subset of touchpoints for a corresponding user that is associated with the user-specified segment from the second query and corresponds to the user-specified dimension from the first query in accordance with the user-specified attribution model from the first query.

17. The system of claim 16, wherein filtering, at each node, the subset of touchpoints for the corresponding user that is associated with the user-specified segment from the second query and corresponds to the user-specified dimension from the first query in accordance with the user-specified attribution model from the first query comprises:
filtering, at each node, to exclude instances of touchpoint data that are not associated with the user-specified segment from the second query or do not correspond to the user-specified dimension from the first query; and
analyzing instances of touchpoint data remaining after the filtering in accordance with the user-specified attribution model from the first query.

18. The system of claim 17, wherein analyzing the instances of touchpoint data remaining after the filtering in accordance with the user-specified attribution model from the first query comprises identifying one or more touchpoints called for by the user-specified attribution model from the first query.

19. The system of claim 14, wherein:
the memory component further comprises:
a first intermediate aggregator corresponding to a first subset of nodes; and
a second intermediate aggregator corresponding to a second subset of nodes, and
the instructions, when executed by the at least one server, cause the system to use the processing units of the nodes to identify the subsets of the set of touchpoint data associated with the user-specified segment from the second query and corresponding to the user-specified dimension from the first query to send to the aggregator based on the user-specified attribution model from the first query by:
using processing units of the first subset of nodes to identify a first subsets of touchpoint data associated with the user-specified segment from the second query and corresponding to the user-specified dimension from the first query based on the user-specified attribution model from the first query; and using processing units of the second subset of nodes to identify a second subsets of touchpoint data associated with the user-specified segment from the second query and corresponding to the user-specified dimension from the first query.

20. The system of claim 19,
further comprising instructions that, when executed by the at least one server, cause the system to:
aggregate, using the first intermediate aggregator, data from the first subsets of touchpoint data associated with the user-specified segment from the second query and corresponding to the user-specified dimension from the first query to generate a first set of aggregated touchpoint data; and
aggregate, using the second intermediate aggregator, data from the second subsets of touchpoint data associated with the user-specified segment from the second query and corresponding to the user-specified dimension from the first query to generate a second set of aggregated touchpoint data,
wherein the instructions, when executed by the at least one server, cause the system to combine, at the aggregator, the subsets of the set of touchpoint data associated with the user-specified segment and corresponding to the user-specified dimension retrieved from the plurality of nodes by combining the first set of aggregated touchpoint data and the second set of aggregated touchpoint data.

* * * * *